United States Patent
Silverstein et al.

(10) Patent No.: US 8,162,483 B2
(45) Date of Patent: Apr. 24, 2012

(54) HIERARCHICAL LIGHT INTENSITY CONTROL IN LIGHT PROJECTOR

(75) Inventors: Barry D. Silverstein, Rochester, NY (US); Richard P. Corey, Rush, NY (US); David R. Dowe, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 388 days.

(21) Appl. No.: 12/491,275

(22) Filed: Jun. 25, 2009

(65) Prior Publication Data

US 2010/0328616 A1    Dec. 30, 2010

(51) Int. Cl.
*G03B 21/14* (2006.01)

(52) U.S. Cl. ............... 353/31; 353/85; 353/94; 362/231

(58) Field of Classification Search .................... 353/31, 353/85, 88, 94; 348/742, 743, 771; 349/5, 349/7, 8, 9; 362/230, 231; 345/82, 83, 87
See application file for complete search history.

(56) References Cited

U.S. PATENT DOCUMENTS

| | | | |
|---|---|---|---|
| 4,441,791 A | 4/1984 | Hornbeck | |
| 5,081,631 A | 1/1992 | Dhurjaty | |
| 5,270,736 A | 12/1993 | Inoue et al. | |
| 5,535,047 A | 7/1996 | Hornbeck | |
| 5,600,383 A | 2/1997 | Hornbeck | |
| 5,764,664 A | 6/1998 | Yip et al. | |
| 5,808,795 A | 9/1998 | Shimomura et al. | |
| 5,907,437 A | 5/1999 | Sprotbery et al. | |
| 6,008,929 A | 12/1999 | Akimoto et al. | |
| 6,069,676 A * | 5/2000 | Yuyama | 349/62 |
| 6,215,547 B1 | 4/2001 | Ramanujan et al. | |
| 6,283,597 B1 | 9/2001 | Jorke | |
| 6,547,396 B1 | 4/2003 | Svardal et al. | |
| 6,621,615 B2 | 9/2003 | Kruschwitz et al. | |
| 6,793,341 B2 | 9/2004 | Svardal et al. | |
| 7,052,138 B2 * | 5/2006 | Matsui | 353/31 |
| 7,172,295 B2 * | 2/2007 | Engle | 353/85 |
| 7,252,392 B2 * | 8/2007 | Matsui | 353/85 |
| 7,377,657 B2 * | 5/2008 | Morejon et al. | 353/85 |
| 7,969,404 B2 * | 6/2011 | Lee et al. | 345/102 |
| 2004/0227456 A1 * | 11/2004 | Matsui | 313/501 |
| 2005/0110958 A1 | 5/2005 | Schwartz et al. | |
| 2005/0248737 A1 | 11/2005 | Engle | |
| 2006/0132403 A1 | 6/2006 | Maximus et al. | |

(Continued)

FOREIGN PATENT DOCUMENTS

EP    1 322 123 A2    6/2003

(Continued)

OTHER PUBLICATIONS

Silverstein, "Projector Using Independent Multiple Wavelength Light Sources", U.S. Appl. No. 11/956,666, filed Dec. 14, 2007.

(Continued)

*Primary Examiner* — William C Dowling
(74) *Attorney, Agent, or Firm* — Kevin E. Spaulding

(57) ABSTRACT

In a light projection system, potentially hierarchical levels of light intensity control ensure proper laser-light output intensity, color channel intensity, white point, left/right image intensity balancing, or combinations thereof. The light projection system can include a light intensity sensor in an image path, in a light-source subsystem light-dump path, in a light-modulation subsystem light-dump path, in a position to measure light leaked from optical components, or combinations thereof.

25 Claims, 21 Drawing Sheets

U.S. PATENT DOCUMENTS

| | | |
|---|---|---|
| 2006/0139245 A1 | 6/2006 | Sugiyama |
| 2006/0192924 A1 | 8/2006 | Seki et al. |
| 2006/0238723 A1 | 10/2006 | El-Ghoroury |
| 2006/0268407 A1 | 11/2006 | Fergason et al. |
| 2006/0279710 A1* | 12/2006 | Tani .................... 353/85 |
| 2006/0285136 A1* | 12/2006 | Shin et al. .............. 358/1.9 |
| 2006/0291053 A1 | 12/2006 | Robinson et al. |
| 2007/0127121 A1 | 6/2007 | Maximus et al. |
| 2008/0165815 A1 | 7/2008 | Kamijima |
| 2008/0185978 A1 | 8/2008 | Jeong et al. |
| 2008/0309884 A1 | 12/2008 | O'Dor et al. |
| 2009/0016390 A1* | 1/2009 | Sumiyama et al. ...... 372/29.01 |
| 2009/0122272 A1 | 5/2009 | Silverstein et al. |
| 2009/0141242 A1 | 6/2009 | Silverstein et al. |
| 2009/0153752 A1 | 6/2009 | Silverstein |
| 2010/0066649 A1* | 3/2010 | Furuya et al. ............ 345/55 |

FOREIGN PATENT DOCUMENTS

| | | |
|---|---|---|
| EP | 1 489 851 | 12/2004 |
| JP | 2005 099160 A | 4/2005 |
| JP | 2007 271667 A | 10/2007 |
| WO | WO 2004/112443 A1 | 12/2004 |
| WO | 2005/109091 | 11/2005 |
| WO | WO 2008/044673 A1 | 4/2008 |

OTHER PUBLICATIONS

Silverstein et al., "Stereo Projection Using Polarized Solid State Light Sources", U.S. Appl. No. 12/036,385, filed Feb. 25, 2008.

Doherty et al., "Phased Reset Timing for Improved Digital Micromirror Device (DMD) Brightness," SID Symposium Digest of Technical Papers, vol. 29, pp. 125-128 (1998).

* cited by examiner

HIERARCHICAL LIGHT INTENSITY CONTROL IN LIGHT PROJECTOR

CROSS REFERENCE TO RELATED APPLICATIONS

This application is filed concurrently with and has related subject matter to:
U.S. patent application Ser. No. 12/491,267, titled "Stereoscopic Image Intensity Balancing in Light Projector", with Barry Silverstein as the first named inventor;
U.S. patent application Ser. No. 12/491,279, titled "Image Path Light Intensity Sensing in Light Projector", with Barry Silverstein as the first named inventor;
U.S. patent application Ser. No. 12/491,288, titled "Dump Path Light Intensity Sensing in Light Projector", with Barry Silverstein as the first named inventor; and
U.S. patent application Ser. No. 12/491,298, titled "Leakage Light Intensity Sensing in Light Projector", with Barry Silverstein as the first named inventor,
each of which is incorporated herein by reference in its entirety.

FIELD OF THE INVENTION

This invention generally relates to monitoring and control of light intensity in a light projection system.

BACKGROUND OF THE INVENTION

There is growing interest in high-quality projection systems that display three-dimensional (3D) or perceived stereoscopic content in order to offer consumers an enhanced visual experience in large venues. Although a number of entertainment companies have offered stereoscopic content in theaters, theme parks, and other venues, these companies have primarily employed film media for stereoscopic image presentation. To create the stereo image, two sets of films are loaded to two separate projection apparatus, one for each eye. Left- and right-eye images are then simultaneously projected using polarized light. One polarization is used for the image presented to the left eye; light of the orthogonal polarization is then used for the image presented to the right eye. Audience members wear corresponding orthogonally polarized glasses that block one polarized light image for each eye while transmitting the orthogonal polarized light image.

In the ongoing transition of the motion picture industry to digital imaging, some vendors, such as Imax, have continued to utilize a two-projection system to provide a high quality stereo image. More commonly, however, conventional projectors have been modified to enable 3D projection.

The most promising of these conventional projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex. DLPs have been successfully employed in digital projection systems. DLP devices are described in a number of patents, for example U.S. Pat. No. 4,441,791; No. 5,535,047; No. 5,600,383 (all to Hornbeck).

The second type of spatial light modulator used for digital projection is the LCD (Liquid Crystal Device). The LCD forms an image as an array of pixels by selectively modulating the polarization state of incident light for each corresponding pixel. LCDs appear to have some advantages as spatial light modulators for high-quality digital cinema projection systems. These advantages include relatively large device size, favorable device yields and the ability to fabricate higher resolution devices, for example 4096×2160 resolution devices available from Sony and JVC Corporations. Among examples of electronic projection apparatus that utilize LCD spatial light modulators are those disclosed in U.S. Pat. No. 5,808,795 (Shimomura et al.) and elsewhere. LCOS (Liquid Crystal On Silicon) devices appear particularly promising for large-scale image projection. However, with LCD components it can be difficult to maintain the high quality demands of digital cinema, particularly with regard to color and contrast, since the high thermal load of high brightness projection affects polarization qualities of these devices.

Conventional methods for forming stereoscopic images from these conventional micro-display (DLP or LCOS) based projectors use either of two primary techniques to distinguish between the left and right eye content. One less common technique, utilized by Dolby Laboratories, for example, uses color space separation, as described in US Patent Application Publication No. 2007/0127121 by Maximus et. al. and elsewhere. Filters are utilized in the white light illumination system to momentarily block out portions of each of the primary colors for a portion of the frame time. For example, for the left eye, the lower wavelength spectrum of Red, Blue, and Green (RGB) is blocked for a period of time. This alternates with blocking the higher wavelength spectrum of Red, Blue, and Green (RGB) for the other eye. The appropriate color adjusted stereo content that is associated with each eye is then presented to each modulator for the eye. The viewer wears a corresponding filter that similarly transmits only one of the two 3-color (RGB) spectral sets.

The second method for forming separate stereoscopic images uses polarized light. In the example embodiment of U.S. Pat. No. 6,793,341 to Svardal et al. and elsewhere, each of two orthogonal polarization states is delivered to a corresponding one of two separate spatial light modulators. Polarized light from both modulators is then projected simultaneously. The viewer wears polarized glasses with polarization transmission axes for left and right eyes orthogonally oriented with respect to each other.

Another approach, commercialized by Real-D, Beverly Hills, Calif., uses a conventional projector modified to modulate alternate polarization states that are rapidly switched from one to the other. This can be done, for example, where a DLP projector has a polarizer placed in the output path of the light. The polarizer is required, since the DLP is not inherently designed to maintain the polarization of the input light, which is generally unpolarized, as the window of the device package depolarizes due to stress induced birefringence. An achromatic polarization switcher, similar to the type described in US application 2006/0291053 by Robinson et al. could be disposed after the polarizer. A switcher of this type alternately rotates polarized light between two orthogonal polarization states, such as linear polarization states, to allow the presentation of two distinct images, one to each eye, while the user views with polarized glasses.

Regardless of whether stereoscopic or monoscopic images are formed, digital projection systems have recently incorporated solid-state light sources, particularly LEDs and lasers, and arrays of these sources. These solid-state light sources offer a number of advantages over earlier lamp-based illumination sources used for color projection. Among such advantages are component life, spectral characteristics, brightness, and overall efficiency. For example, when compared against arc lamp and other solutions using a single white light source, solid-state sources expand the available color gamut for projection.

One problem raised by the use of solid-state light sources relates to achieving a suitable balance of the light output from each color channel. Driver circuitry for solid-state light sources can be factory-calibrated to obtain a target white point or color balance from a projector. However, factors such as component aging and drift can degrade the initial color adjustment so that the color balance is no longer acceptable. This problem is even more pronounced for stereoscopic imaging. An image formed for the left eye of the viewer should closely match the corresponding image formed for the right eye of the viewer in terms of overall brightness and color balance. Failure to achieve a compatible intensity of color channels for left- and right-eye images can render the projected stereoscopic images as unappealing or, at worst, as visually disturbing to the viewer.

Thus, there is a need to provide a greater measure of control over light intensity output by light projection systems, for monoscopic as well as for stereoscopic projection.

SUMMARY OF THE INVENTION

The above-described problem is addressed and a technical solution is achieved in the art by systems and methods for monitoring or controlling light intensity, according to various embodiments of the present invention. In an embodiment of the present invention, a light projection system includes an image forming subsystem and a projection subsystem. The image forming subsystem can include a plurality of light modulation channels. Each light modulation channel can include a light source subsystem that generates coherent light of a particular color channel. The generated light can travel along an image path to a light modulation subsystem configured at least to interact with the coherent light in a manner consistent with image data. Depending upon the image data, the light modulation subsystem passes light it receives to the projection subsystem for projection or along a dump path to a beam dump.

The light projection system can include a light-intensity-correction subsystem. The light-intensity correction subsystem can include a light intensity sensor in the image path, in the dump path, or in a position that receives light leaked from an optical component in the image forming subsystem. In embodiments where the image forming subsystem generates stereoscopic light, such image sensor can be located in a light dump path associated with the light source subsystem (to be contrasted with the light dump path associated with the light modulation subsystem). The light-intensity-correction subsystem can be configured to monitor and control light intensity output by individual lasers in the light source subsystem, color channel light intensity for each light modulation channel, left-eye/right-eye light beam balancing, white point, or combinations thereof.

In embodiments where combinations thereof are monitored and controlled, the light-intensity-correction subsystem can further be configured to balance white point, color channel intensities, or both, by reducing the intensity output by one or more color channels when another color channel cannot have its output increased. Such an arrangement allows white point and color channel intensity to remain balanced even when lasers experience lower intensity output with age or failure.

It is an advantage of the present invention that it allows automatic fine-tuning adjustment of output intensity on multiple levels: laser, color channel, left/right stereoscopic, and white point, to compensate for drift and component aging or failure.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

It should be noted that, unless otherwise explicitly noted or required by context, the word "or" is used in this disclosure in a non-exclusive sense.

Embodiments of the present invention address the need for improved monitoring and control of light intensity in coherent-light projection systems. For example, embodiments of the present invention provide improved intensity balancing between left-eye and right-eye images in stereoscopic projection systems. For another example, embodiments of the present invention provide various light-intensity sensor configurations allowing a preferred configuration to be chosen based on design choice. For yet another example, embodiments of the present invention provide improved system-level intensity control with a feedback system. The feedback system manages white-point intensity control via feedback from a color-channel intensity control system, and manages color-intensity control via feedback from a laser-intensity-control system. For still yet another example, embodiments of the present invention include failure response procedures that adjust light intensity in manners that account for the inability of one or more light sources to achieve a threshold light output intensity. These and other capabilities and benefits will be described in more detail in the remainder of this description.

Figure 1:
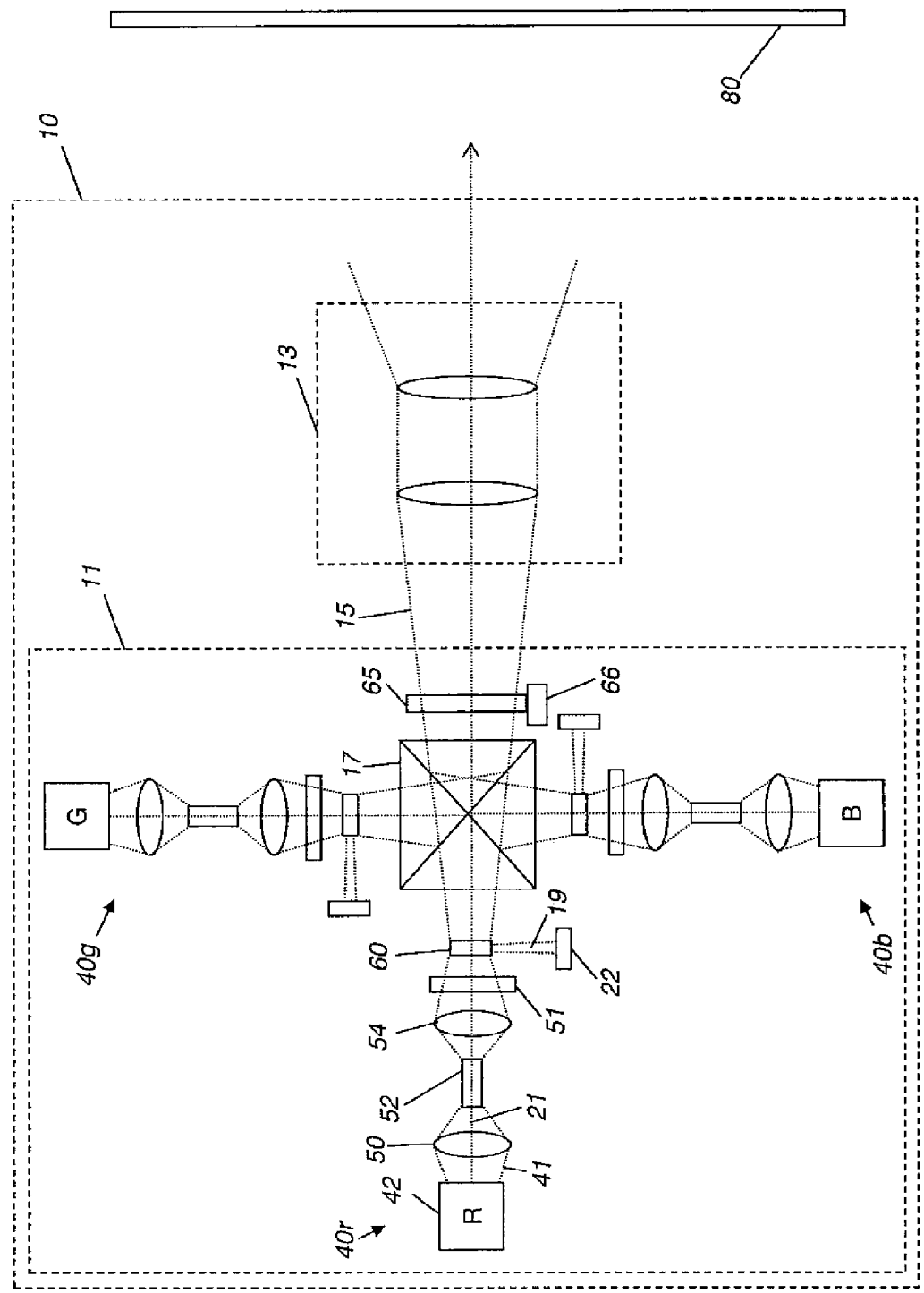
FIG. 1 illustrates optical components in a light projection system that can be common to various embodiments of the present invention.

In order to better understand the various embodiments of the present invention, it is instructive to first describe example components that can be common to such various embodiments. These example components are shown in FIG. 1, which illustrates a light projection system 10 that can be used for embodiments of the present invention. However, one of ordinary skill in the art will appreciate that the invention is not limited to the particular optical components and configuration thereof shown in FIG. 1 and that other optical components, configurations, or both can be used.

The light projection system 10 includes an image forming system 11 (also referred to as an image forming subsystem) that outputs light 15. Depending upon whether the image forming subsystem 11 is configured to be a monoscopic or stereoscopic image forming system using techniques known in the art, the light 15 can be monoscopic or stereoscopic. Consequently, the light projection system 10 can be a monoscopic or a stereoscopic light projection system 10, depending upon the configuration of the image forming subsystem 11.

The light 15 output from the image forming subsystem 11 is received by a projection system 13 (also referred to as a projection subsystem) that projects a monoscopic or stereoscopic image, depending upon the configuration of the image forming subsystem 11. In this regard, the projection subsystem 13 can include one or more lens elements as is known in the art. In some embodiments, the projection subsystem 13 projects the monoscopic or stereoscopic image towards a display surface 80.

The light 15 can include multiple color channels of light. In FIG. 1, the light 15 includes red, green, and blue modulated color channels of light from light modulation channels $40r$, $40g$, and $40b$, respectively. However, one of ordinary skill in the art will appreciate that the invention is not limited to any particular number or configuration of color channels. In FIG. 1, the red, green, and blue color channels are combined by a dichroic combiner 17 to form the light 15 output from the image forming system 11.

In the example of FIG. 1, each light modulation channel $40r$, $40g$, and $40b$ includes a coherent light source system 42 (also referred to as a coherent light source subsystem or just a light source subsystem). Note that FIG. 1 includes reference numerals for the components of only the red light modulation channel $40r$ for purposes of clarity. However, it should be understood that the same components are also represented in FIG. 1 for the other light modulation channels $40g$ and $40b$, albeit without reference numerals.

Each coherent light source subsystem 42 emits a single color channel of the multiple color channels of light, in this case, red, green, or blue. Consequently, each coherent light source subsystem 42 emits coherent light 41 along an image path 21, optionally into a lens 50 that directs light into an optional polarization maintaining light guide 52. Although the image path 21 is shown straight in FIG. 1, it need not be. Also, although the light guide 52 is shown as being rectangular for simplicity, one of ordinary skill in the art will appreciate that light guides often take different shapes, such as a tapering shape. At the output of light guide 52, or otherwise directly receiving light from lens 50 or light source system 42, a lens 54 then directs light through an integrator 51, such as a fly's eye integrator or integrating bar known in the art, for example. The light exiting the integrator 51 proceeds downstream along the image path 21 to a light modulation system (or subsystem) 60. The light modulation subsystem 60 can include a spatial light modulator, known in the art.

Each light modulation subsystem 60 interacts with the light it receives (originally from corresponding light source subsystem 42) in a manner consistent with image data, such as image data representing an image frame in a movie. In this regard, control signals are provided to each light modulation subsystem 60 by a data processing system (not shown), such as a control system, that controls each light modulator subsystem 60 in the manner consistent with image data using techniques and equipment known in the art. In particular, the light modulation subsystems 60 can include two-dimensional arrays of addressable modulator pixels (not shown) that modulate incident light in accordance with the image data signals. Light modulation can be provided by a variety of devices, including redirection by tilting of micro-mirrors (DLP), polarization rotation (LCOS or LCD), light scattering, absorption, or diffraction.

Each light modulation subsystem 60 causes light generated from the respective light source subsystem 42 to follow either the image path 21 or a respective light dump path 19 in a manner consistent with the image data. The light dump path 19 leads to a respective beam dump 22 and does not lead to the projection subsystem 13. On the other hand, the image path 21 does lead to the projection subsystem 13. For example, if the image data indicates that a particular pixel is to be fully bright, i.e., have maximum intensity, the respective light modulation subsystem 60 causes the light associated with such pixel to fully pass along the image path 21. On the other hand, if the image data indicates that a particular pixel is to be fully off, i.e., have no light intensity, the respective light modulation subsystem 60 causes the light associated with such pixel to fully pass along the light dump path 19. In the case where the image data indicates that a particular pixel is to have moderate intensity, i.e., not fully on or fully off, the respective light modulation subsystem 60 causes some of the light associated with such pixel to pass along the image path 21 and some to pass along the light dump path 19. Although FIG. 1 shows a separate light dump path 19 and beam dump 22 for each light modulation channel, some or all of the light modulation channels 40 can share a light dump path 19 and beam dump 22, depending upon design choice.

Light passed or directed along the image path 21 by the light modulation subsystem 60 gets combined with corresponding light from the other light modulation channels 40*g*, 40*b* by dichroic combiner 17. The combined light 15 output by dichroic combiner 17 (and, consequently, the image forming subsystem 11 in this example) passes through an optional shutter 65 (when it is in an open position) and onto the projection subsystem 13. In certain situations, the shutter 65 can be in a closed position, such as when the light projection system 10 is warming up or is in a light-intensity measurement or other diagnostic state. When the shutter 65 is in a closed position, further projection of downstream-progressing light, whether monoscopic or stereoscopic, is prevented. In other words, no light exits the image forming subsystem 11 or, consequently, the light projection system 10. The shutter 65 is moved into its open and closed positions by a motor 66 and additional mechanical components (not shown) that are known in the art.

Figure 4:
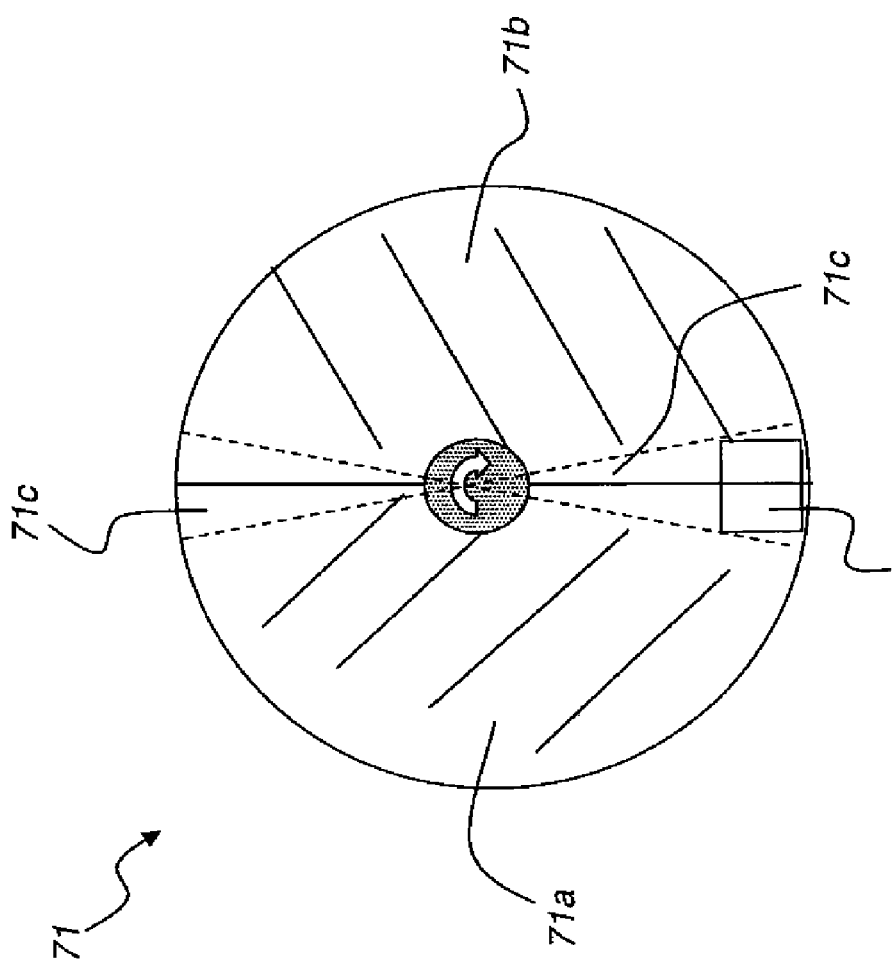
Figure 5:
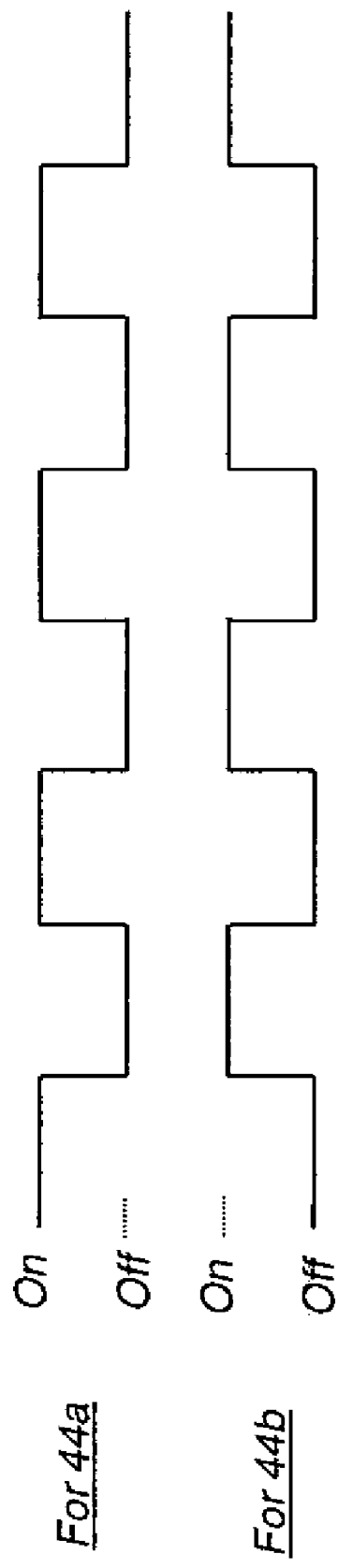

The projection subsystem 13 directs the modulated light output from the image forming subsystem 11 to a display surface 80. As discussed above, the light projection subsystem 13 can project monoscopic images, stereoscopic images, or both, depending upon design of the image forming subsystem 11. Although the invention is not limited to any particular configuration of the image forming subsystem 1 to generate either monoscopic or stereoscopic light, FIG. 2 illustrates just one example of a light source subsystem 42 that generates monoscopic light, and FIGS. 3-5 illustrate just one example of a light source subsystem 42 that generates stereoscopic light.

Figure 2:
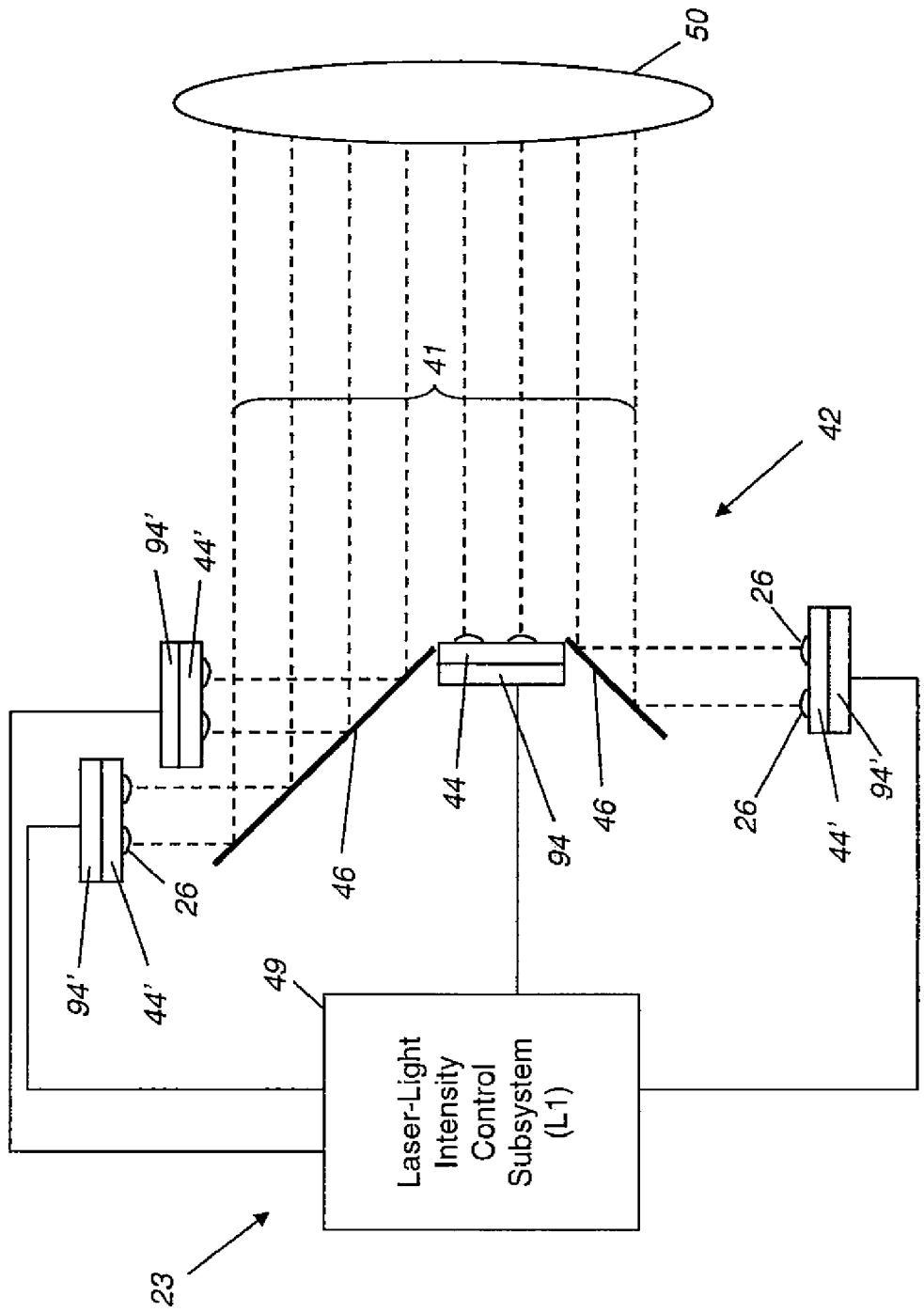
FIG. 2 illustrates a monoscopic light source subsystem with a laser-light intensity control subsystem, according to some embodiments of the present invention.

In FIG. 2, monoscopic light is generated from a plurality of individual lasers 26 (not all are labeled with a reference numeral in FIG. 2 for purposes of clarity). In this example, the individual lasers 26 are formed in solid state laser arrays 44, which are driven by laser drivers 94, 94'. It should be noted that laser drivers 94, 94' are merely shown symbolically in FIG. 2 and need not be integrally formed with laser arrays 44, as shown. Laser drivers are well known in the art, and the invention is not limited to any particular configuration. Similar comments pertain to FIG. 3, described below. Coherent light emitted from the laser arrays 44' are redirected by mirrors 46 so that they are combined with the coherent light emitted from the laser array 44. The laser-light intensity measurement system 49 shown in FIG. 2 (and FIGS. 3 and 4) will be described below.

Figure 3:
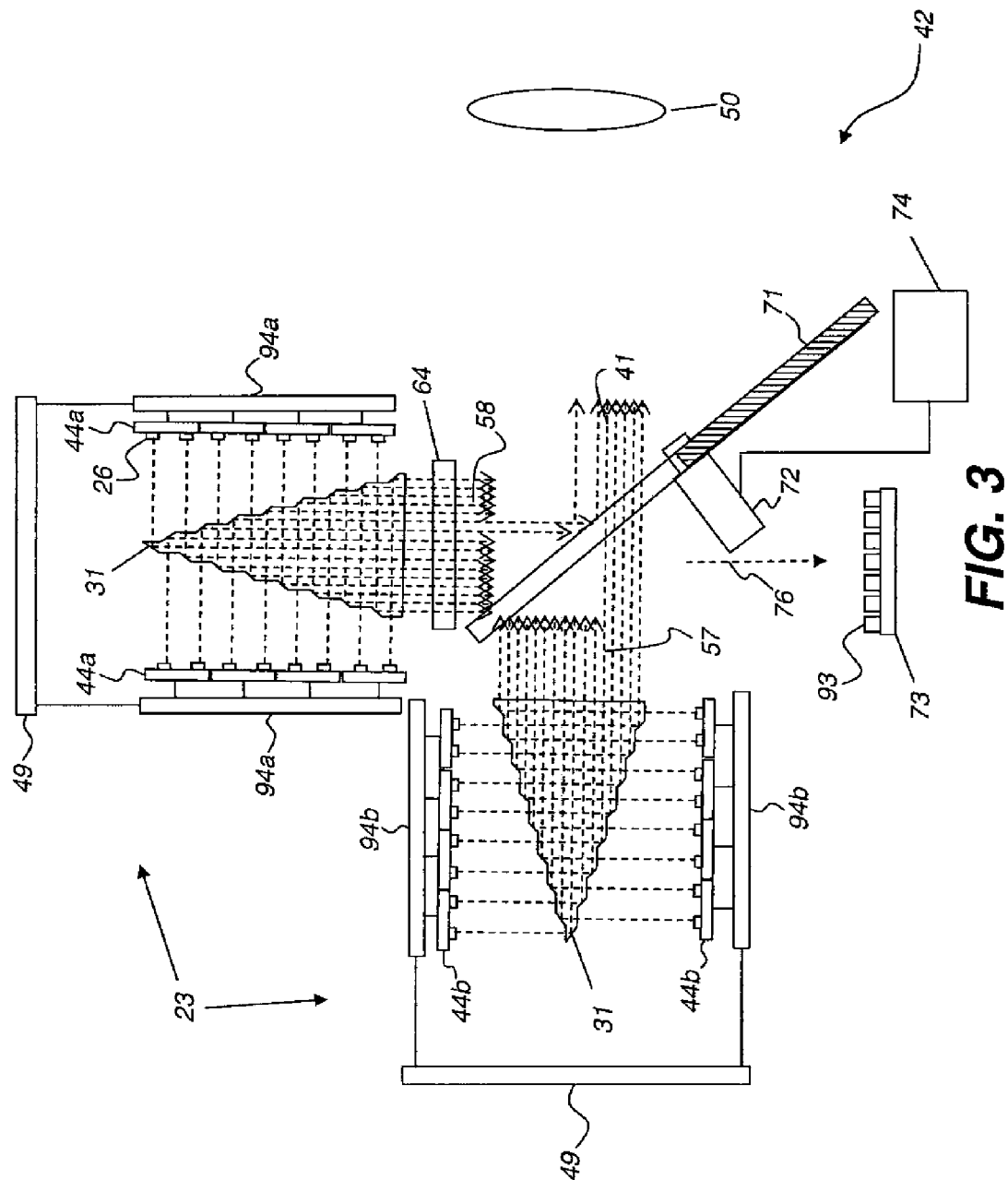
FIGS. 3-5 illustrate a light source subsystem with a laser-light intensity control subsystem, the light source subsystem capable of generating stereoscopic and monoscopic light, according to some embodiments of the present invention.

In FIG. 3, stereoscopic light is generated from two banks of polarized solid state laser arrays 44*a*, 44*b* (not all are labeled with a reference numeral in FIG. 3 for purposes of clarity). Polarized laser arrays 44*a* and 44*b*, driven by laser drivers 94*a*, 94*b*, provide light to respective light redirecting prisms 31, known in the art. The light redirecting prisms 31 redirect the light they receive towards a rotating shutter 71. A half-wave plate 64 converts light from laser arrays 44*a* into a polarization state orthogonal to the light from laser arrays 44*b*. The light output by the half-wave plate 64 represents a right-eye light beam 58, which has an orthogonal polarization state to the left-eye light beam 57.

A rotating shutter 71 is located in the path of the optical axis merged between the orthogonal polarization states. The position of the rotating shutter 71 is controlled by control circuitry 74 that controls a motor 72. Rotating shutter 71, shown in FIG. 4, has a transmissive disk with a least two segments. A first segment 71*a* is designed to substantially transmit all of the light that is incident upon it. The alternate segment 71*b* is designed to substantially reflect all of the light that is incident upon it. When transmission segment 71*a* lies along the optical axis, laser arrays 44*b* transmit through to the rest of the image forming subsystem 11, while laser arrays 44*a* are transmitted along a light dump path 76 to be absorbed by a beam dump 73. The light source subsystem light dump path 76 is to be contrasted with the light modulation subsystem light dump path 19, in some embodiments. In particular, the light dump path 76 is associated with a light source subsystem 42 for some stereoscopic embodiments, and dumps the left-eye light beam or right-eye light beam, whichever one is in an off state per FIG. 5. On the other hand, the light dump path 19, in some embodiments, is associated with a light modulation subsystem 60, and dumps light (whether monoscopic or stereoscopic) that is not needed to form an image per image data.

Optional individual laser light-intensity sensors 93 are described later. Alternately, when reflective segment 71*b* (FIG. 4) is along the optical axis, light from laser arrays 44*a* (FIG. 3) are reflected through to the rest of the image forming subsystem 11, and light from laser arrays 44*b* is directed to beam dump 73. In this manner, output light 41 (FIG. 1, FIG. 3) of alternating orthogonal polarizations is delivered along the image path 21 to the spatial light modulation subsystem 60, as shown in FIG. 1. The spatial light modulation subsystem 60 generates stereoscopic images from this light 41 in a manner consistent with left-eye and right-eye image data.

It should be noted that a transition region 71*c* exists between polarization states, as shown in FIG. 4. Light 75 between the two regions 71*a* and 71*b* contains both polarization states. This condition causes crosstalk between the images of the two eyes, also known as ghosting. Some amount of crosstalk may be acceptable. If the crosstalk is excessive, the spatial light modulation subsystem 60 may be turned to the off state during this transition period, eliminating the crosstalk at the cost of some lost light. The time when the spatial light modulation subsystem 60 is off between left-eye and right-eye light beam generation is referred to as a blanking period. Therefore, it can be desirable to reduce the transition region 71*c*. Such reduction can be achieved by either reducing the spot size of the light 75 or by enlarging the shutter wheel 71, placing the light 75 as far toward the outer diameter as practical.

For non-stereoscopic applications of the embodiment of FIG. 3, the light from both banks of polarized laser arrays 44a and 44b may be used together to provide a brighter monoscopic image (regardless of alternating polarizations). The laser arrays 44a, 44b can be used at half power to balance the lifetime of each laser source and to generate a monoscopic image as bright as the stereoscopic image. In this regard, it can be seen that the light source subsystems 42 can generate both monoscopic and stereoscopic images in a single configuration.

Returning to FIG. 2, a light-intensity-correction subsystem 23 is illustrated that includes a laser-light intensity control subsystem 49 (sometimes referred to as "L1" or "L1 subsystem") in a monoscopic light source subsystem 42, according to an embodiment of the present invention. One skilled in the art will appreciate, however, that the subsystem 49 can be used with other monoscopic implementations besides the one shown in FIG. 2. The laser-light intensity control system 49 monitors and controls output light intensity from each laser 26. In embodiments where the laser-light intensity control system 49, or the laser-light-intensity control system 23, for that matter, includes only a monitoring function, such systems are sometimes referred to herein as "measuring" systems instead of "control" systems.

Monitoring of output light intensity from each laser 26 can occur in any number of ways. For example, monitoring of light-intensity of a laser 26 can occur within the corresponding laser array 44, using techniques known in the art. In this case, a feedback loop, not shown, would connect each laser array 44 to the L1 subsystem 49. Another technique for monitoring light intensity of an individual laser is to place a light intensity sensor, such as a photo-diode, in a position to receive and measure light originating from a laser, but leaked from an optical component in the image forming subsystem. For example, a photo-diode could be placed behind a mirror (such as one of the mirrors 46) or other substantially reflective optical element that reflects such laser light beam. Typically, the best mirror coatings will still leak around 0.2 to 0.5% of the light incident. Such leakage light can be measured to determine intensity of the corresponding laser light beam. In this regard, a photo-diode (not shown) could be placed behind one of the mirrors 46 at a position that would measure leaked light from or substantially from a laser beam from one of the lasers 26. Such techniques can also be used to measure color channel intensity and white point described below.

According to some embodiments of the present invention, the L1 subsystem 49 controls output light intensity from each laser 26 either by increasing or decreasing voltage or current to or adjusting duty cycle (repeated on/off time) of laser drivers 94, 94' associated with each laser array 44, 44'. Such drivers 94, known in the art, have associated circuitry, not shown, that allows output light intensity control of each individual laser 26 in associated laser array 44, 44'.

FIGS. 3 and 4 illustrate a light-intensity-correction subsystem 23 that includes a laser-light intensity control subsystem 49 in a stereoscopic light source subsystem 42, according to an embodiment of the present invention. One skilled in the art will appreciate, however, that the subsystem 49 can be used with other stereoscopic implementations besides the one shown in FIGS. 3 and 4.

As with the monoscopic embodiment of FIG. 2, the laser-light intensity control system 49 monitors and controls output light intensity from each laser 26. In this regard, although any technique can be used, output light intensity from each laser 26 can be measured internally by the corresponding laser arrays 44a, 44b. Another example is to measure output light intensity from each laser 26 using corresponding individual laser light-intensity sensors 93 on beam dump 73. In this case, as light from either laser arrays 44a or 44b are passed to the beam dump by the rotating shutter 71, individual laser light-intensities can be measured. Accordingly, feedback from sensors 93 can be provided to the L1 subsystem 49 by some communicative connection, not shown in FIG. 3. Also as with the embodiment of FIG. 2, the laser-light intensity control system 49 monitors and controls output light intensity from each laser 26.

Figure 6:
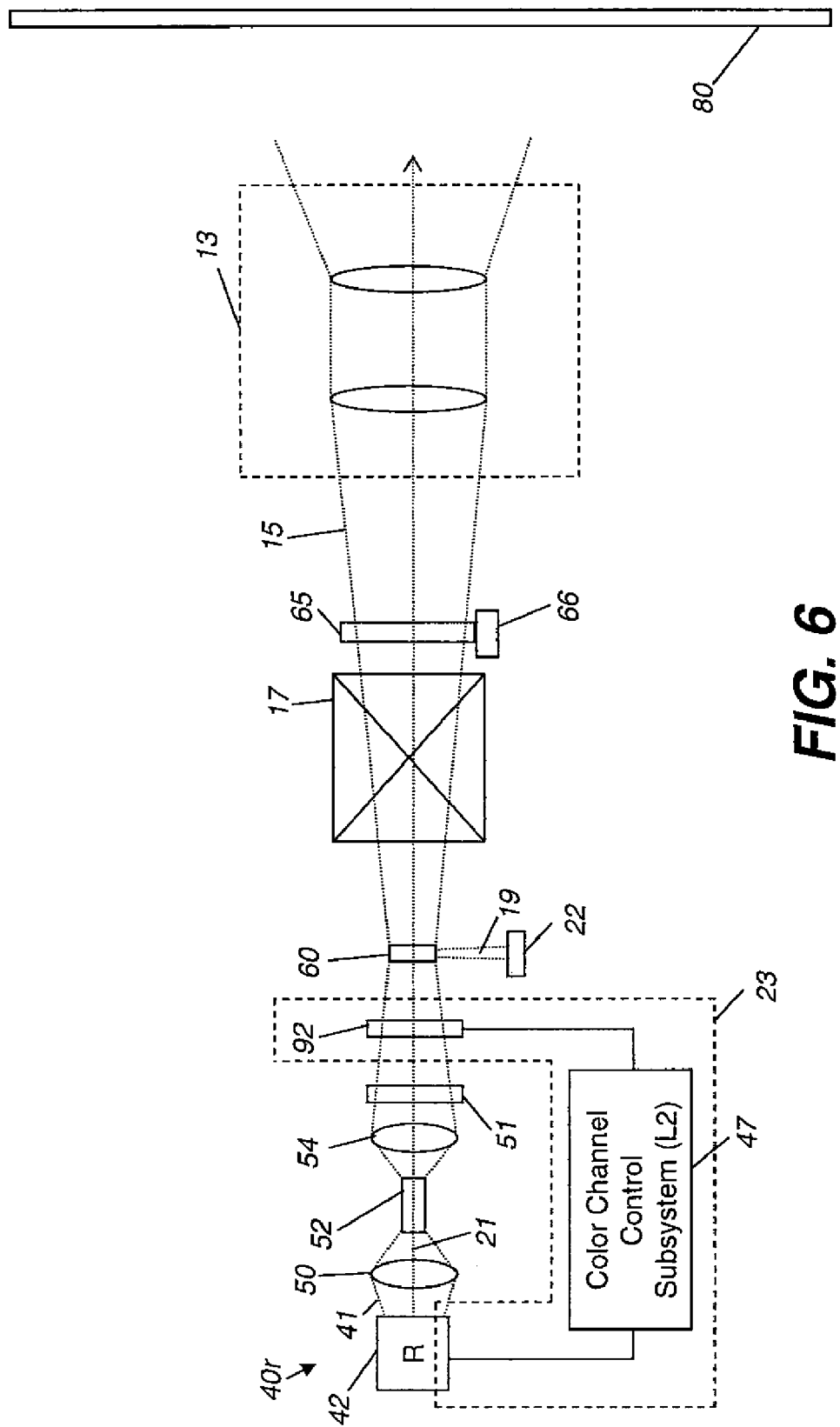
FIG. 6 illustrates a color channel intensity control subsystem with a light-intensity sensing subsystem located, at least in part, in an image path, according to some embodiments of the present invention.

FIGS. 6-13 illustrate color-channel-level intensity monitoring and control according to various embodiments of the present invention. In particular, FIG. 6 illustrates a light-intensity-correction subsystem 23 for the red light modulation channel 40r, according to an embodiment of the present invention. The light-intensity-correction subsystem 23 shown in FIG. 6 can be repeated for each of the other color channels. In some embodiments, the light-intensity-correction subsystem 23 includes a color channel intensity control subsystem 47 (sometimes referred to as "L2" or "L2 subsystem") and a light-intensity sensing subsystem 92. The sensing subsystem 92 can include one or more sensors, such as photodiodes, that measure light intensity. The light-intensity-correction subsystem 23 can also include appropriate connections and control circuitry, known in the art, to directly or indirectly control laser drivers 94 (not shown in FIG. 6) to adjust the coherent light 41 generated by the light source subsystem 42, as needed.

In FIG. 6, the sensing subsystem 92 can be located in the image path 21. In this regard, the sensing subsystem 92 can be attached to a mechanical device (not shown) and motor (not shown), for example, that moves the sensing subsystem 92 into and out of the image path 21. The sensing subsystem 92 can be moved into the image path 21, for example, when the shutter 65 is closed, so that intensity measurements can be taken. When viewable images are being generating by the image forming subsystem 11 (shown in FIG. 1, but not FIG. 6 for clarity), e.g., when the shutter 65 is open, the sensing subsystem 92 can be removed from the image path 21.

Figure 7:
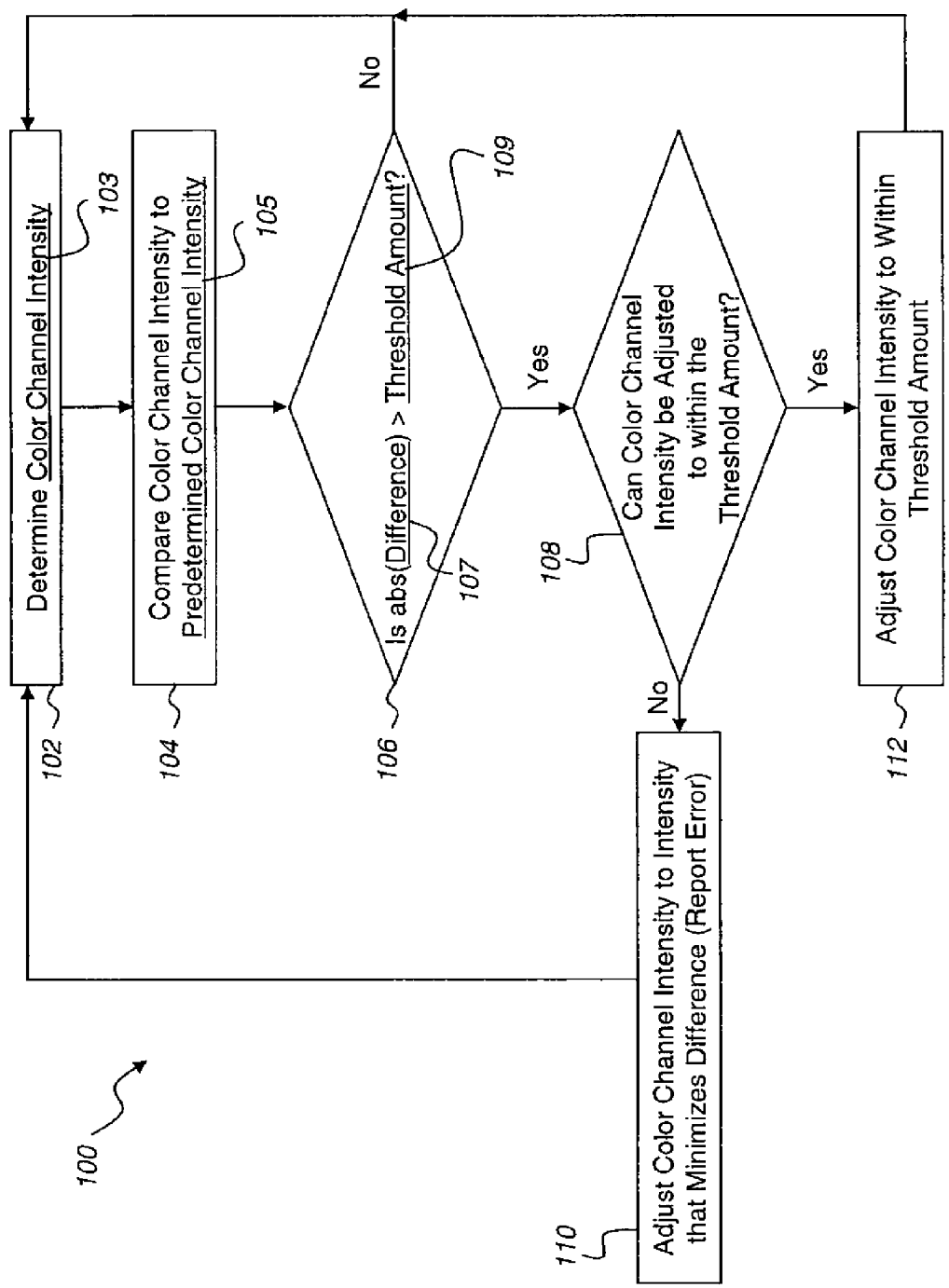
FIG. 7 illustrates a method for monitoring and controlling color channel intensity, according to some embodiments of the present invention.

FIG. 7 illustrates a method 100 performed by the L2 subsystem 47 for monitoring and adjusting a color channel intensity, according to embodiments of the present invention. At process state 102, the L2 subsystem 47 determines an intensity 103 of a color channel from information received from the sensing subsystem 92. In the example of FIG. 6, the L2 subsystem 47 determines an intensity of the red color channel from information received from the sensing subsystem 92. At process state 104, the L2 subsystem 47 compares the color channel intensity 103 to a predetermined color channel intensity 105. The predetermined color channel intensity 105 can be, for example, a color channel intensity (a) set at manufacture, (b) configured by a user via user input, (c) determined by present use of the light projection system 10 (e.g., presentation of a feature film can have an associated first color channel intensity, and presentation of advertisements between feature films can have an associated second color channel intensity less than the first), (d) dependent upon present intensities of other color channels, (e) controlled by a white point control subsystem 59, discussed below, or (f) combinations thereof.

At process state 106, the L2 subsystem 47 determines whether the absolute value of the difference 107 between the color channel intensity 103 and the predetermined color channel intensity 105 is greater than a threshold amount 107.

Such threshold amount 107 can be very small (e.g., much less than 1%) depending upon the requirements of the light projection system 10.

If the answer is deemed "no" at process state 106, normal color channel intensity is presumed and processing returns to process state 102 for continued monitoring. If the answer is deemed "yes" at process state 106, the L2 subsystem 47 determines at process state 108 whether the color channel intensity 103 can be adjusted to cause the difference 107 to be within the threshold amount 109. For example, if individual lasers 26 in laser arrays 44 have failed or are failing, coherent light 41 generated by the corresponding light source subsystem 42 may be below the predetermined color channel intensity 105 by an amount greater than the threshold amount 109. And, because of the failed or failing lasers 26, the intensity of the light 41 output by the light source subsystem 42 may not be able to be increased. Consequently, the L2 subsystem 47 can determine, at process state 108 that the color channel intensity 103 cannot be increased to cause the difference 107 to be within the threshold amount 109. As described in more detail below, the determination at process state 108 can be based, at least in part, from feedback provided by the L1 subsystem 49. However, the L1 subsystem 49 and L2 subsystem 47 need not coexist, and some embodiments of the present invention have an L1 subsystem 49 without an L2 subsystem 47, and vice versa. The same applies for the white point control subsystem 59, described below.

In cases where a "no" is determined at process state 108, the L2 subsystem 47 adjusts the color channel intensity, if possible, to an intensity that minimizes or substantially minimizes the difference 107. In this case, an error can be reported at process state 110 to a user or to another control system, such as a white point control system 59, describe below, that can take corrective action. Such corrective action can be to set the predetermined color channel intensity 105 for the present and the other color channels to a lower intensity. For example, if the red color channel intensity is less than the predetermined color channel intensity 105 by an amount greater than the threshold amount 109, and if the L2 subsystem 47 cannot increase the red color channel intensity, the predetermined color channel intensity 105 for this and, optionally, at least one of the other channels can be reduced. After process state 110, processing returns to process state 102 for continued monitoring.

In cases where a "yes" is determined at process state 108, the L2 subsystem 47 adjusts or instructs adjustment of the color channel intensity 103 so that the difference 107 is within the threshold amount 109 at process state 112. In some embodiments, light source subsystems 42 are set at manufacture to output less than (e.g., 90%) their maximum capable output, allowing upward adjustments of output light intensity as individual lasers 26 age or fail. After process state 112, processing returns to process state 102 for continued monitoring.

Figure 8:
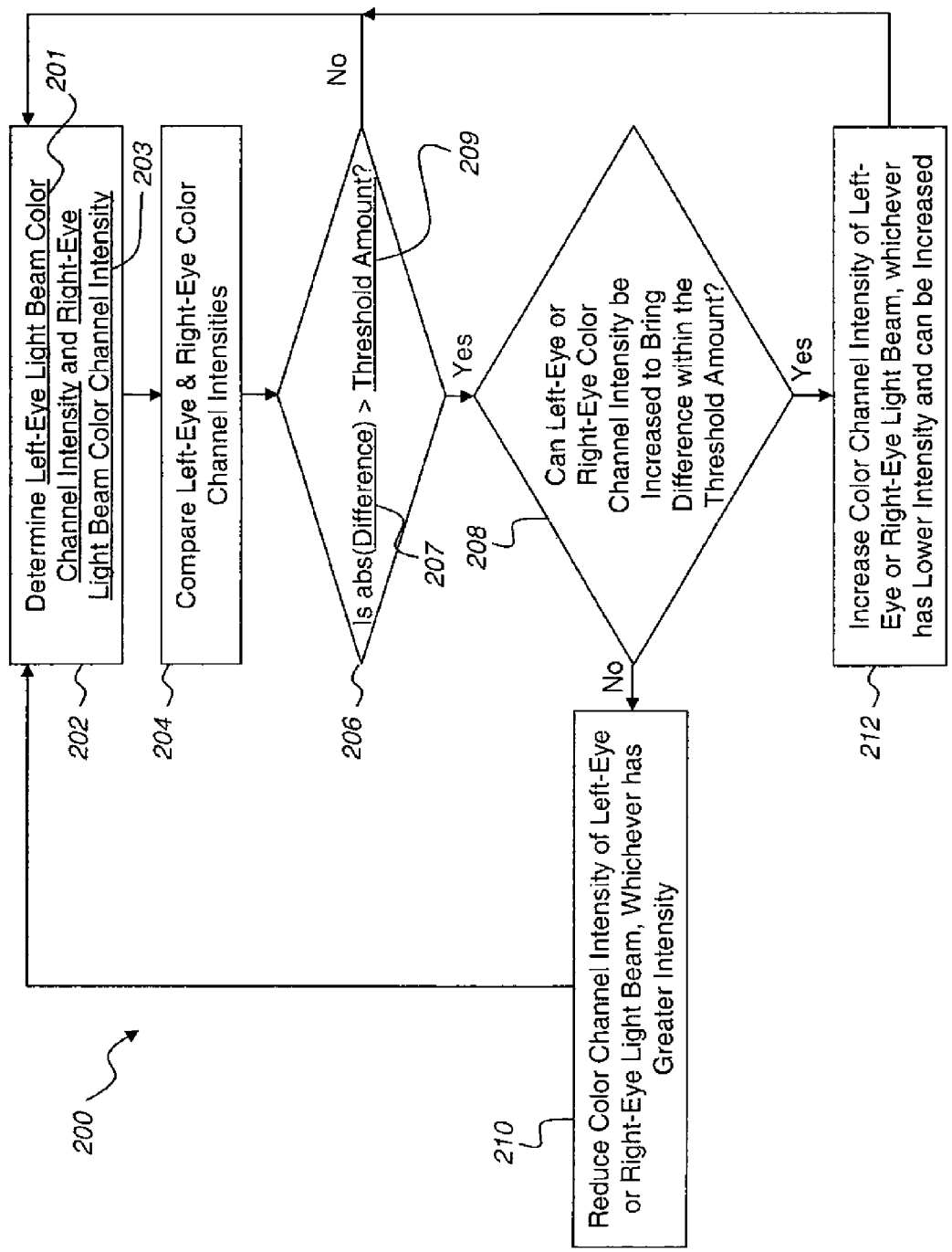
FIG. 8 illustrates a method for monitoring and controlling intensity balance between left-eye and right-eye light beams, according to some stereoscopic embodiments of the present invention.

FIG. 8 illustrates a method 200 performed by the L2 subsystem 47 for monitoring and adjusting left-eye and right-eye color channel intensity, according to embodiments of the present invention involving stereoscopic imaging. In the case of stereoscopic projection, a perceptible difference between light intensity for left and right eyes can easily occur where polarization or spectral differences are used to distinguish left-eye from right-eye images projected for the viewer. With polarization-separation devices, this intensity difference can result whether or not the same light sources are used for the image directed to each eye. This intensity difference is caused because there is some unavoidable amount of light leakage when using polarization components. If the intensity difference is large enough, distraction or discomfort can occur in viewers of the images.

At process state 202, the L2 subsystem 47 determines a left-eye light beam color channel intensity 201 and a right-eye light beam color channel intensity 203 from information received from the sensing subsystem 92. In this regard, the sensing subsystem 92 or the L2 subsystem 47 can have timing circuitry that informs the L2 subsystem 47 which measurements correspond to the left-eye light beam or right eye-light beam.

At process state 204, the L2 subsystem 47 compares the left-eye and right-eye color channel intensities 201, 203. At process state 206, the L2 subsystem 47 determines whether the absolute value of the difference 207 between the left-eye and right-eye color channel intensities 201, 203 is greater than a threshold amount 209.

If the answer is deemed "no" at process state 206, a normal color channel intensity difference is presumed between the left-eye and right-eye light beams and processing returns to process state 202 for continued monitoring. If the answer is deemed "yes" at process state 206, the L2 subsystem 47 determines at process state 208 whether the left-eye color channel intensity 201 or the right-eye color channel intensity 203 can be increased to cause the difference 207 to be within the threshold amount 209. Consequently, it can be seen that these embodiments at process state 208 lend a preference to increasing intensity to fix intensity differences. However, the invention is not limited to such a preference, and decreasing intensity can be preferred.

If the light beam (left or right) with the lesser intensity cannot be increased, a "no" is deemed correct at process state 208. In this case, the light-intensity-correction subsystem 23 controls the image forming subsystem 11, or more specifically, the corresponding light source subsystem 42 of the image forming subsystem 11, to reduce the left-eye color channel intensity 201 or the right-eye color channel intensity 203 at process state 210, whichever had the greater intensity. After process state 210, processing returns to process state 202 for continued monitoring.

If the light beam (left or right) with the lesser intensity can be increased, a "yes" is deemed correct at process state 208. In this case, the light-intensity-correction subsystem 23 controls the image forming subsystem 11, or more specifically, the corresponding light source subsystem 42 of the image forming subsystem 11, to increase the left-eye color channel intensity 201 or the right-eye color channel intensity 203 at process state 212, whichever had the lesser intensity. After process state 212, processing returns to process state 202 for continued monitoring.

Although FIG. 8 illustrates embodiments where either the left-eye color channel intensity 201 or the right-eye color channel intensity 203 is increased or decreased to reduce the difference 207, the invention is not so limited. One of ordinary skill in the art will appreciate that one of the color channel intensities (left or right) can be increased and the other decreased in order to reduce the difference 207.

Figure 9:
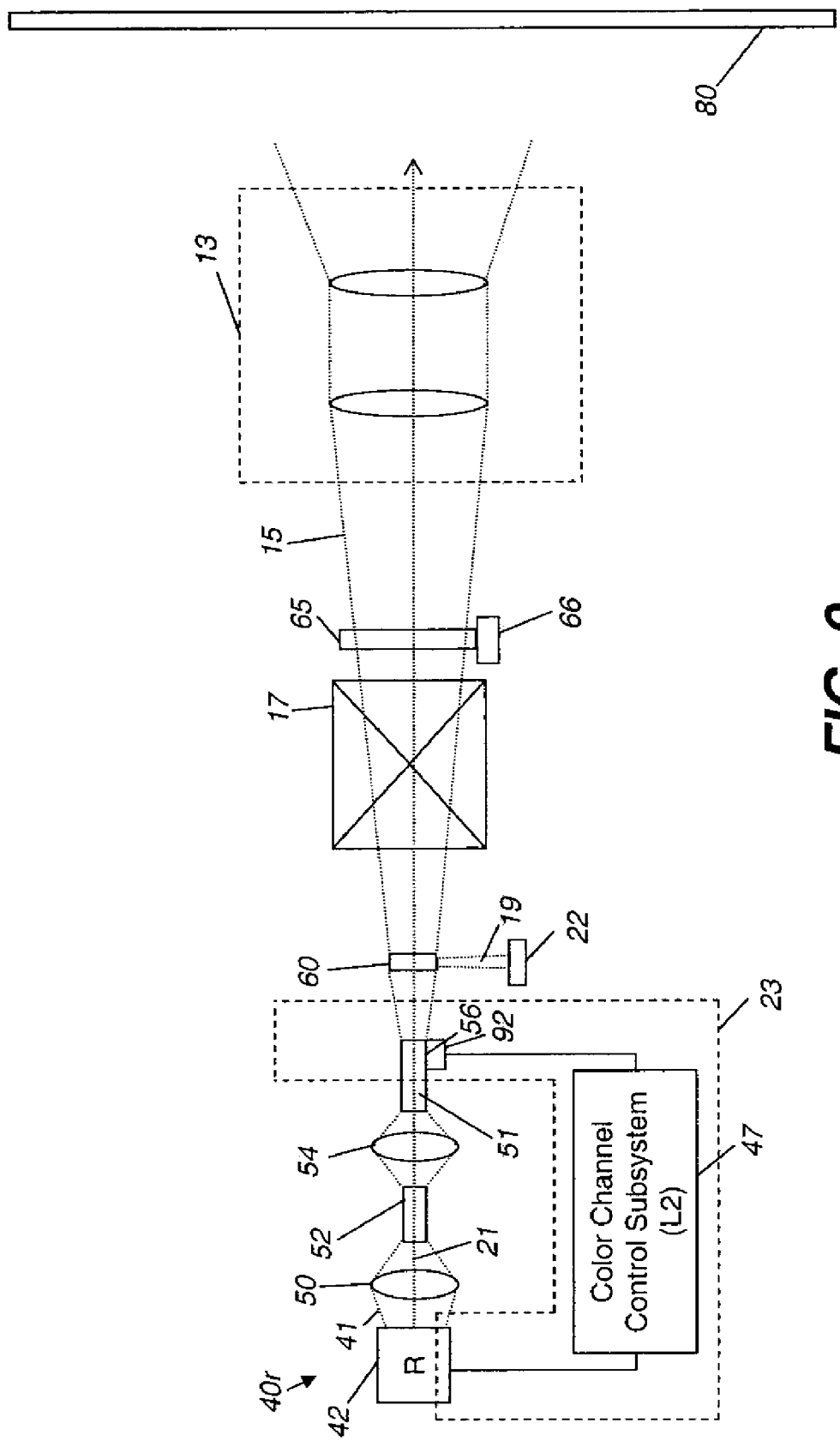
FIGS. 9 and 10 illustrate a color channel intensity control subsystem with a light-intensity sensing subsystem located, at least in part, in a position to measure light leaked from an optical component, according to some embodiments of the present invention.
Figure 10:
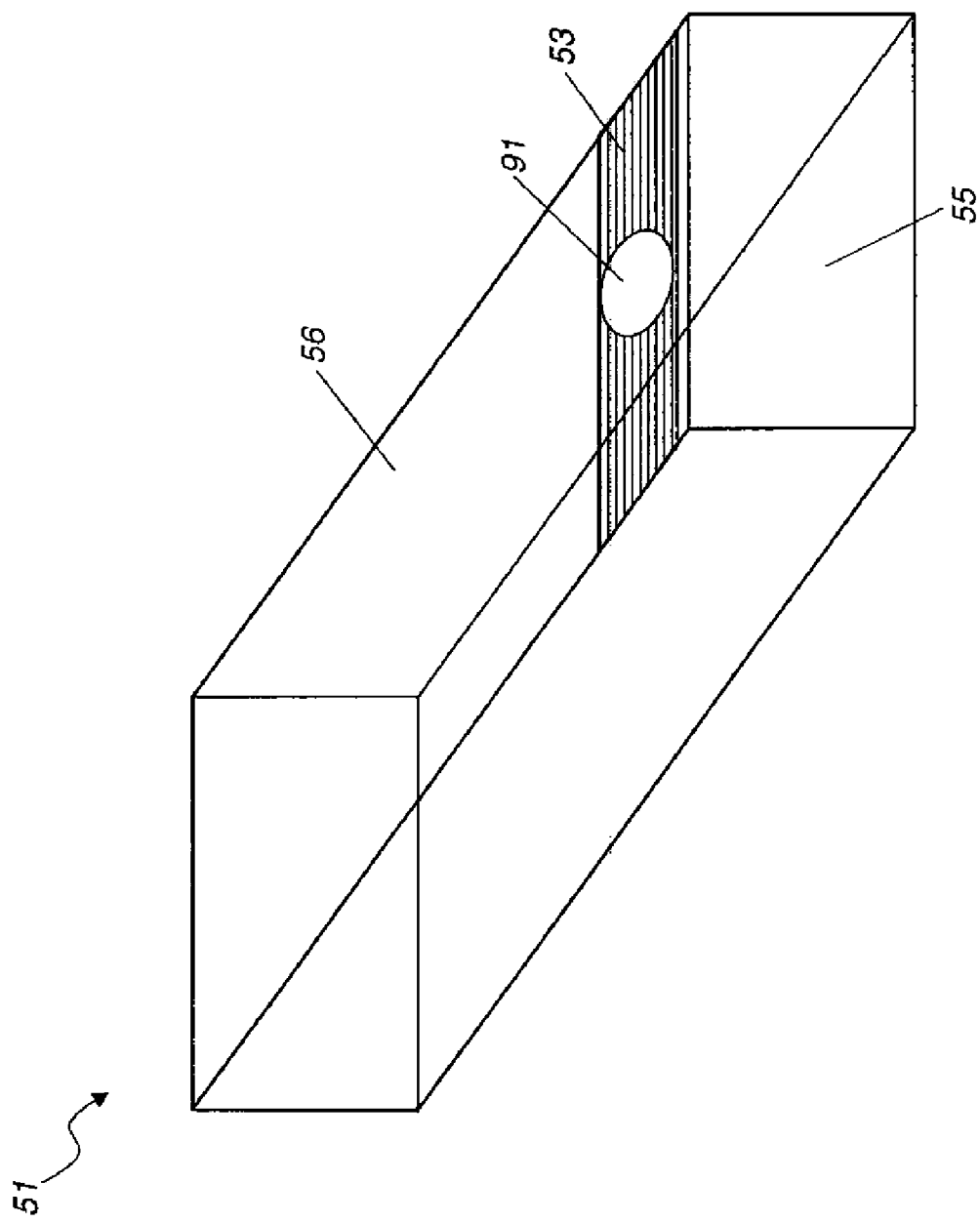

FIGS. 9 and 10 illustrate a light-intensity-correction subsystem 23 that includes a light-intensity sensing subsystem 92 having at least one light-intensity sensor 91 located on a side 56 of the integrator 51, according to embodiments of the present invention. The side 56 runs in a direction relatively parallel to the image path 21 or the optical axis of the integrator 51. Remember that the sides of the integrator 51 can taper toward or away from the image path 21.

In the embodiments based on FIGS. 9 and 10, the sensing subsystem 92 is positioned to monitor the light intensity from light leaked from the integrator 51 along the image path 21. In this regard, FIGS. 9 and 10 illustrate embodiments where a light intensity sensor is in a position to receive and measure light leaked from an optical component, in this case, the integrator 51, in the image forming subsystem 11. In the case of measuring leaked light from the integrator 51, it can be desirable to monitor light that is substantially uniform in intensity and polarization. Accordingly, although not required, it can be preferred to place the sensing subsystem 92 (or a sensor therein) on a portion of the integrator 51 where light proceeding through the integrator 51 has been substantially uniformized, e.g., on the downstream portion of the integrator 51.

FIG. 10 illustrates an embodiment where the integrator 51 has a translucent cover 53 underneath a sensor 91 on the side 56. Although only one sensor 91 is shown in FIG. 10, additional sensors can be used. The translucent cover 53 can be wrapped around the integrator 51 and has a lower index of refraction than the material of which the integrator 51 is made. Such an index of refraction difference allows the translucent cover 53 to improve the total internal reflection inside the integrator 51 and, consequently, to improve unifoirmization. Surface imperfections on the integrator 51, however, still provide some small level of leakage light to exit the sides of the integrator 51 and pass through the translucent cover 53 for measurement by the sensor 91. When the light leakage passes through the translucent cover 53, it is further diffused, providing light that is even more uniform to the sensor 91 for measurement.

The embodiments of FIGS. 9 and 10 can operate using the procedures of FIGS. 7 and 8, except that the color channel intensities 103, 201, 203 are determined from leakage light from the integrator 51. Calibration procedures can be used to determine the amount of leakage light present at the location of the sensor 91.

Figure 11:
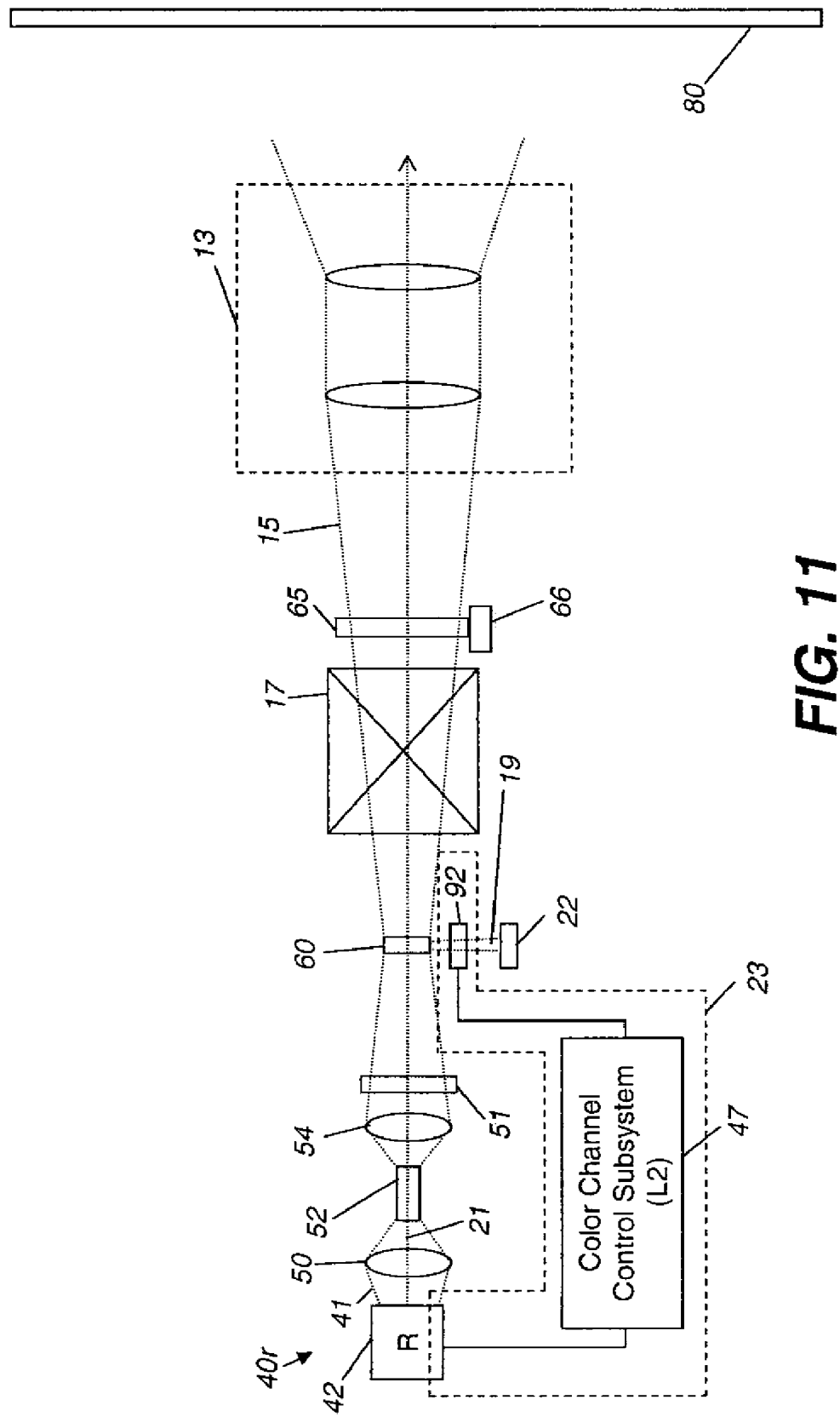
FIG. 11 illustrates a color channel intensity control subsystem with a light-intensity sensing subsystem located, at least in part, in a light dump path associated with a light modulation subsystem according to some embodiments of the present invention.

FIG. 11 illustrates a light-intensity-correction subsystem 23 that includes a light-intensity sensing subsystem 92 located in the light dump path 19. Such an arrangement can be beneficial because the sensing subsystem 92 does not interfere with the image path 21 and can instead measure intensity of light that might otherwise be wasted. In these embodiments, the procedures of FIGS. 7 and 8 can be used by the L2 subsystem 47, except that the color channel intensities 103, 201, 203 are determined from light entering the light dump path 19. In this regard, the sensing subsystem 92 measures intensity during a period where the spatial light modulator 60 is at a known position, e.g., at a fully off position that directs all light to the light dump path 19, at a calibration position, or some other known position.

In this regard, specific intensity measurement periods can be generated for the light projection system 10, not only with the embodiments of FIG. 11, but any of the embodiments of the invention. For example, such measurement periods can occur (a) during or contemporaneously with completion of construction of the image forming system 11, (b) during or contemporaneously with a startup procedure initiated by a powering-on or rebooting of the image forming system 11, (C) just prior to projecting a video with the projection system 13, (d) while the shutter 65 is closed, or combinations thereof. In regard to some stereoscopic light projection systems 10, a portion of the blanking period between the left and right eye light beams can be utilized as an intensity measurement period.

Figure 12:
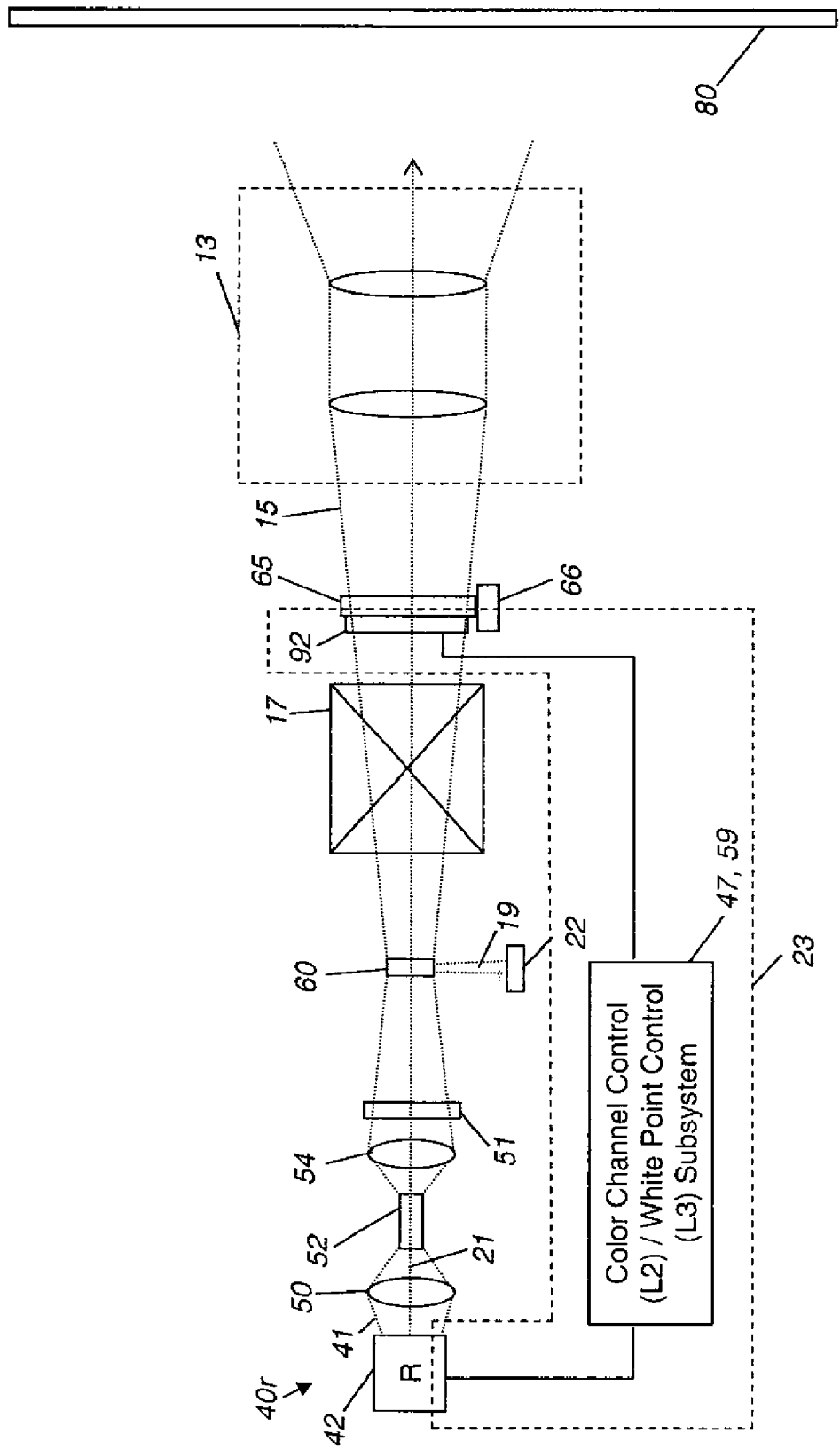
FIGS. 12 and 13 illustrate a color channel intensity control subsystem and a white point control subsystem with a light-intensity sensing subsystem located, at least in part, in an image path on a shutter, according to some embodiments of the present invention.
Figure 13:
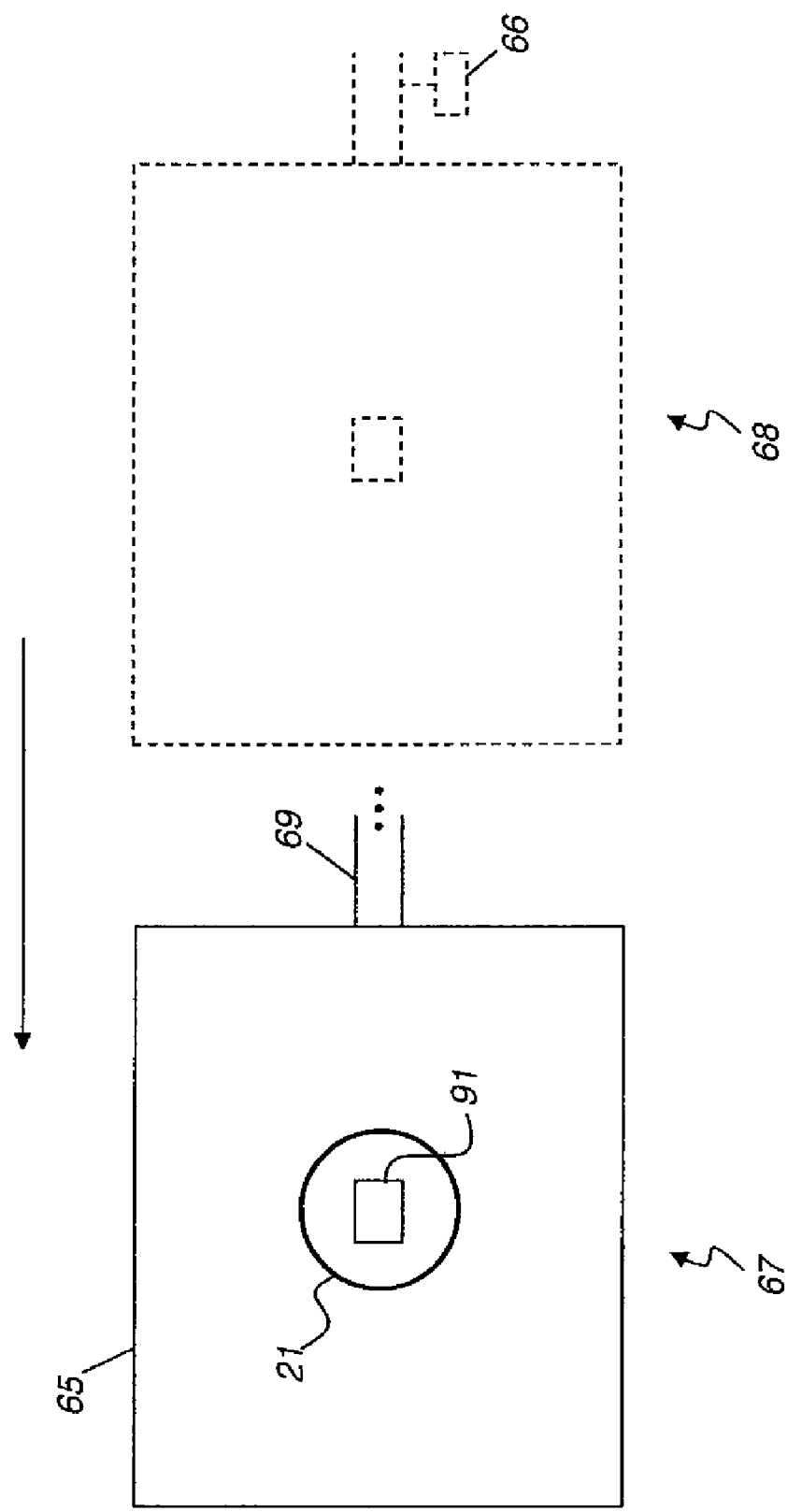

FIGS. 12 and 13 illustrate a light-intensity-correction subsystem 23 that includes a color channel intensity control subsystem 47, a white point control subsystem 59 (also referred to as the "L3 subsystem"), or both, according to some embodiments of the present invention. In these embodiments, the light-intensity-correction subsystem 23 also includes a light-intensity sensing subsystem 92 having at least one light-intensity sensor 91 located on the shutter 65. It should be noted that the sensing subsystem 92 is located downstream of the dichroic combiner 17 and, therefore, is in a position to measure the intensity of all of the color channels. This arrangement eliminates the need for separate sensing subsystems 92 for each color channel. Consequently, individual color channel intensities as well as white point (all color channels simultaneously) can be measured and controlled. Individual color channel intensities can be monitored and controlled by the color channel intensity control subsystem 47 using the processes of FIGS. 7 and 8 white point can be measured and controlled by a white point control subsystem (L3 subsystem) 59 using the process of FIG. 14, described below.

As shown for example in FIG. 13, the shutter 65 can be placed into an open position 68 removed from the image path 21 or into a closed position 67 in the image path 21 by a motor 66 and mechanical arm 69. One skilled in the art, however, will appreciate that the invention is not limited to any particular technique for moving the shutter 65 into and out of the image path 21. When the shutter 65 is in the closed position 67, the light-intensity sensor 91 is placed into the image path 21 for measurements. Although only one sensor 91 is shown in FIG. 13, multiple sensors can be used. When the shutter 65 is in the open position 68, the sensor 91 is out of the image path 21. A similar design to that shown in FIG. 13 can be used for embodiments based on FIG. 6.

When the shutter 65 is in the closed position, the image forming system 11 (FIG. 1) is prevented from outputting light to the projection subsystem 13. The closing of the shutter 65 commonly is done in commercial cinema projectors to allow the projector to maintain its operation while other content is shown on the screen 80. In this closed position, the processes of FIGS. 7 and 8 can be executed by the L2 subsystem 47 while only one of the light source subsystems 42*r*, 42*g*, 42*b* are on at time. In particular, each light source subsystem 42*r*, 42*g*, 42*b* can be cycled on, e.g., fully on, one at a time, while the other color channels are off, so that each color channel's intensity can be measured and adjusted, as needed.

Figure 14:
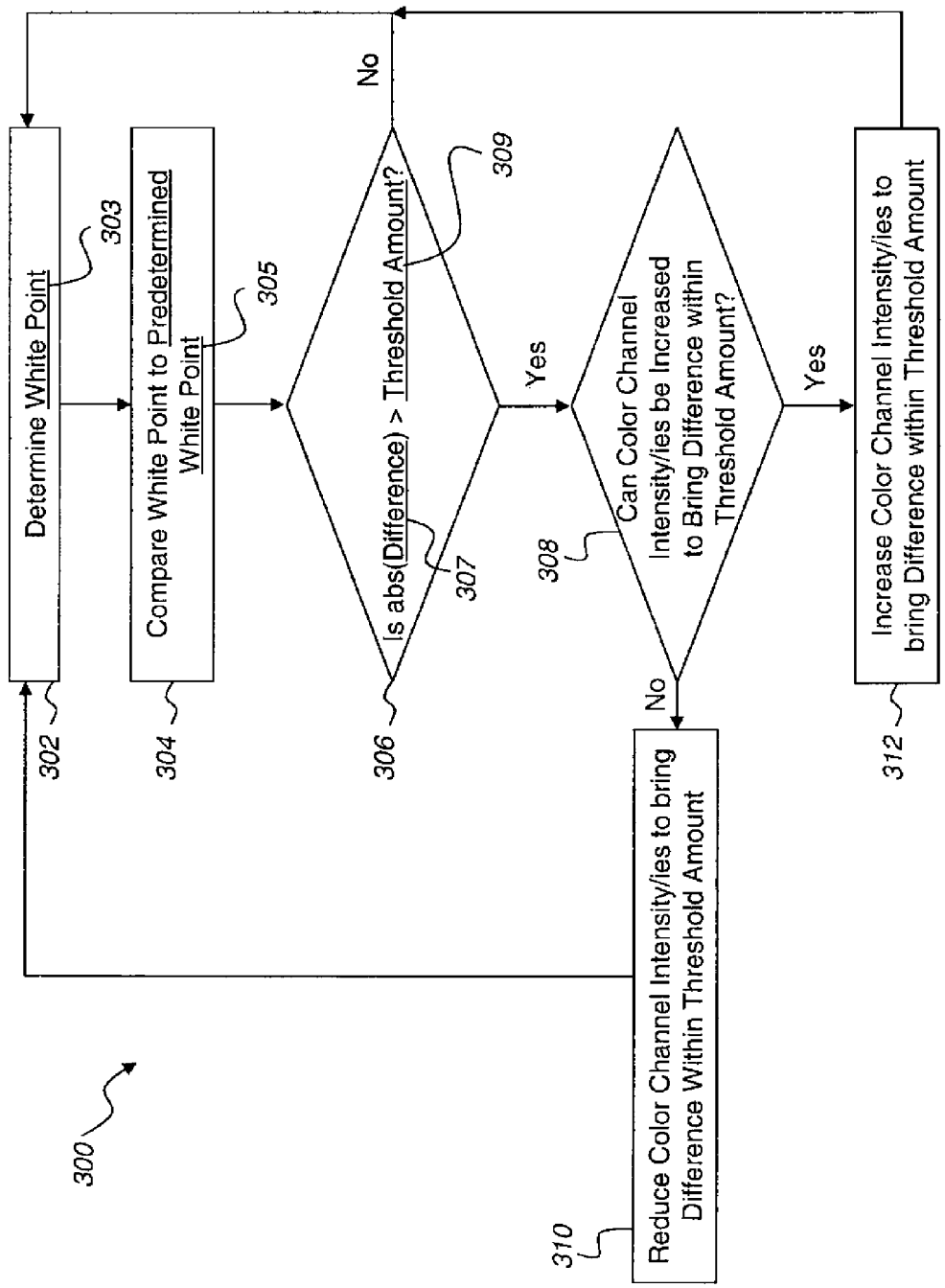
FIG. 14 illustrates a method for monitoring and controlling white point, according to some embodiments of the present invention.

Also while the shutter 65 is in the closed position, a white-point monitoring and control process 300 shown in FIG. 14 can be executed by the white point control subsystem 59. At process state 302, a white point 303 is determined from an intensity measurement received by the sensing subsystem 92 when all color channels are simultaneously in an on, e.g., fully on, state. At process state 304, the white point 303 is compared to a predetermined white point 305. The predetermined white point 305 can be, for example, a white point (a) set at manufacture, (b) configured by a user via user input, (c) determined by present use of the light projection system 10 (e.g., presentation of a feature film can have an associated first white point, and presentation of advertisements between feature films can have an associated second white point less than the first), (d) present capabilities of the light source subsystems 42*r*, 42*g*, 42*b* (e.g., lasers 26 aging or failing will impact white point intensity capabilities, as discussed with respect to process states 108 and 110 in FIG. 7), or (d) combinations thereof.

At process state 306, the L3 subsystem 59 determines whether the absolute value of the difference 307 between the white point 303 and the predetermined white point 305 is greater than a threshold amount 307. If the answer is deemed "no" at process state 306, normal white point is presumed, and processing returns to process state 302 for continued monitoring. Alternatively, the shutter 65 can be opened or other action taken. If the answer is deemed "yes" at process state 306, the L2 subsystem 47 determines at process state 308 whether the difference 307 can be reduced to within the threshold amount 309 by increasing the intensity of one or more of the color channels. For example, a problematic light source subsystem 42 may be generating its maximum light intensity, but generating less light intensity than the other color channels (as described with respect to states 108 and 110 in FIG. 7, above). Consequently, the difference 307 may be greater than the threshold amount 309. Because this problematic light source subsystem 42 already is generating maximum intensity, its color channel intensity cannot be increased to reduce the difference 307 to within the threshold amount 309. In this case, a "no" is determined by the L3 subsystem 59 at process state 308. It can be seen that the analysis at process state 308 reflects a bias to increase color channel intensity to correct white point problems. One skilled in the art will appreciate, however, that such a bias is not required.

If a "no" is determined at process state 308, the intensities of one or more color channel intensities is or are reduced to bring the difference 307 to within the threshold amount 309 at process state 310. In embodiments where both an L3 subsystem 59 and an L2 subsystem 47 are present, the L3 subsystem 59 at process state 310 can lower the predetermined color channel intensity 105 for one or more color channels, as shown in FIG. 7.

If a "yes" is determined at process state 308, one or more color channel intensities is or are increased to bring the difference 308 to within the threshold amount at process state 312. In embodiments where both an L3 subsystem 59 and an L2 subsystem 47 are present, the L3 subsystem 59 at process state 310 can raise the predetermined color channel intensity 105 for one or more color channels, as shown in FIG. 7. Upon conclusion of process state 310 or 312, processing returns to process state 302 for continued monitoring. Alternatively, the shutter 65 can be opened or other action taken.

Figure 15:
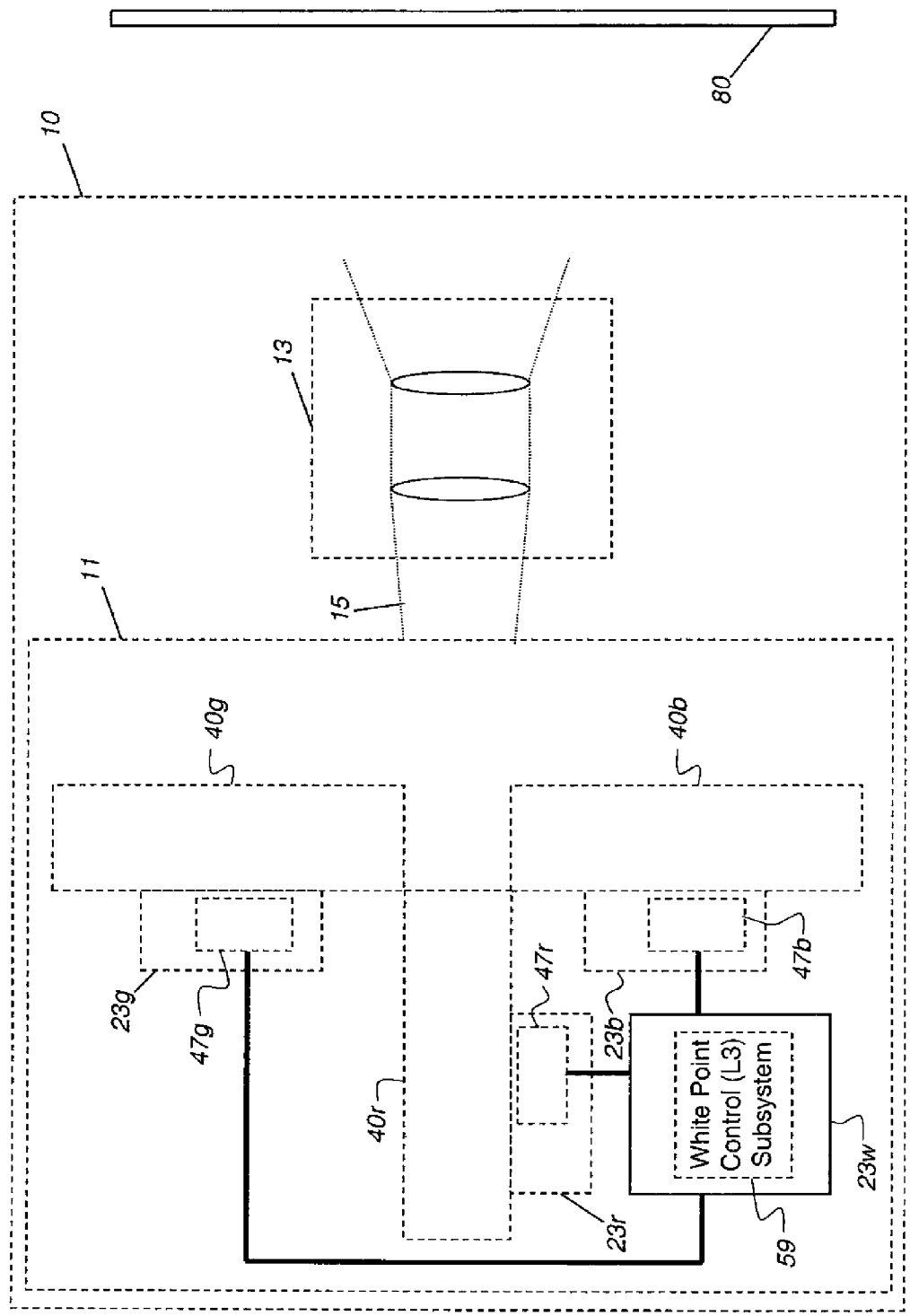
FIG. 15 illustrates a white point control subsystem with a light-intensity sensing subsystem located, at least in part, in an image path on a shutter, according to some embodiments of the present invention.

FIG. 15 illustrates white point measurement and control for embodiments where each color channel has its own sensing subsystem 92 for color channel intensity control and there is not necessarily a sensor downstream of the dichroic combiner 17 for direct sensing of white point. In particular, FIG. 15 represents each color channel as having its own portion of a light intensity control subsystem 23r, 23g, 23b (as is the case in FIGS. 6, 9, and 11) for color channel control (via respective color channel intensity control subsystems 47r, 47g, 47b). In addition, FIG. 15 illustrates an additional portion of the light intensity correction subsystem 23w that includes a white point control subsystem (L3 subsystem) 59 for white point control. The L3 subsystem 59 executes the process of FIG. 14 and receives individual color-channel intensity measurements from each of the portions 23r, 23g, 23b of the light-intensity correction subsystem when performing process state 302.

As alluded to above, some embodiments of the present invention include a hierarchical structure among the various intensity control subsystems. In the case of FIG. 15, the L3 subsystem 59 receives information from the L2 subsystems 47r, 47g, 47b as to their respective present output intensity level. The L3 subsystem 59 uses this information to check for proper white balance per the procedure of FIG. 14. If an adjustment needs to be made to an intensity of one of the color channels, the L3 subsystem 59 instructs one or more of the L2 subsystems 47r, 47g, 47b to change its predetermined color channel intensity 105 accordingly. If an L2 subsystem 47r, 47g, or 47b cannot meet its predetermined color channel intensity 105, the L2 subsystem can report this condition to the L3 subsystem 59. A similar hierarchical structure can exist between the L2 subsystem 47 and the L1 subsystem 49, according to some embodiments of the present invention. In these cases, the L2 subsystem 47 can instruct the L1 subsystem 49 to change the output intensity of its lasers 26. If the L1 subsystem 49 cannot do so, it can report such a condition to its corresponding L2 subsystem 47.

Figure 16:
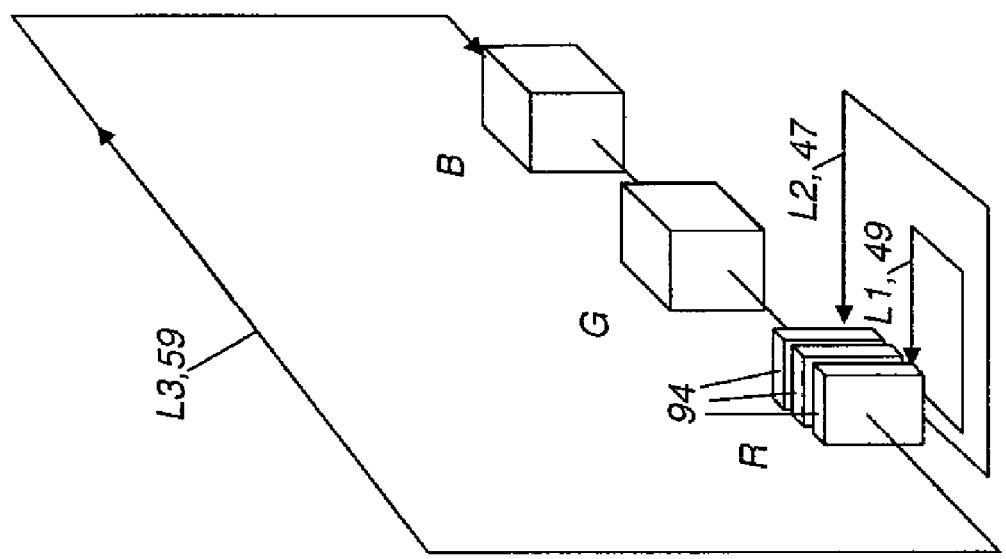
FIG. 16 illustrates a hierarchy of individual laser, color channel, and white point control loops, according to some embodiments of the present invention.

In this regard, FIG. 16 illustrates a hierarchy of control loops L1, L2, L3 in embodiments of the present invention where all three levels of intensity control (L1—laser, L2—color channel, L3—white point) are present. As mentioned earlier, some embodiments of the present invention do not have all three levels, such as embodiments that have only one level (e.g., the embodiments of FIGS. 2-4 having L1 only), or embodiments that have only two levels (e.g., the embodiments of FIGS. 6, 9, 11 having L1 and L2 only). As shown in FIG. 16, feedback from the L1 subsystem 49 is provided to the L2 subsystem 47 for color channel intensity control, and feedback from the L2 subsystem 47 is provided to the L3 subsystem 59 for white point control. As described separately earlier in this description, the L1 subsystem 49 monitors and controls the output intensity of each laser 26 by controlling associated laser drivers 94. The L2 subsystem 47 receives information from the L1 subsystem 49 as to the present output intensity level and output capabilities of the corresponding lasers. The L2 subsystem 47 uses this information to check for proper color channel output intensity, left-eye/right-eye output intensity balance, or both, per the procedures of FIGS. 7, 8, or both, respectively. If an adjustment needs to be made to the intensity of the lasers in light source subsystem 42, the L2 subsystem 47 instructs the L1 subsystem 49 to change the intensity output of one or more of its lasers accordingly. Some of the information that can be provided by the L1 subsystem 49 to the L2 subsystem 47 can include a binary indication of whether or not the L1 subsystem 49 is able to obtain or maintain the laser output level instructed by the L2 subsystem 47, such as per the inquiries at process state 108 or 208 in FIGS. 7 and 8, respectively. Other information can include laser operating current, laser operating voltage, laser input power, laser output power, laser and driver operating temperatures, elapsed laser operating time, or combinations thereof. The prompting of information to be provided from the L1 subsystem 49 to the L2 subsystem 47 can be initiated by the L2 subsystem 47 when needed, by the L3 subsystem 59 when needed, by user request, by expiration of a predetermined time period, or combinations thereof.

The interaction between the L2 subsystem 47 and the L3 subsystem 59 in FIG. 16 is as described above with respect to FIG. 15. In the event that the output intensity of a color channel cannot be increased, as per the inquiry at process state 308 in FIG. 14, the L2 subsystem reports this fact to the L3 subsystem 59.

It can be seen that control loops L1, L2, L3 are interrelated in some embodiments of the present invention. Adjustments within one of these control loops impacts the status and control of the other control loops in the hierarchy. For example, control of the red color channel output intensity using color channel control intensity control loop L2 can affect not only the laser intensity control loop L1 for each red laser driver 94, but also the white point control loop L3. This interrelationship allows a measure of compensation for conditions of components within the control loop. For example, poor performance of a particular laser in a color channel can affect the current provided to other lasers in the same color channel, such as to boost power in order to compensate for an aging component.

In the same way, white point control loop L3 can compensate for a weaker color channel by reducing the output of other color channels in order to preserve the desired white point, as previously described.

Figure 17:
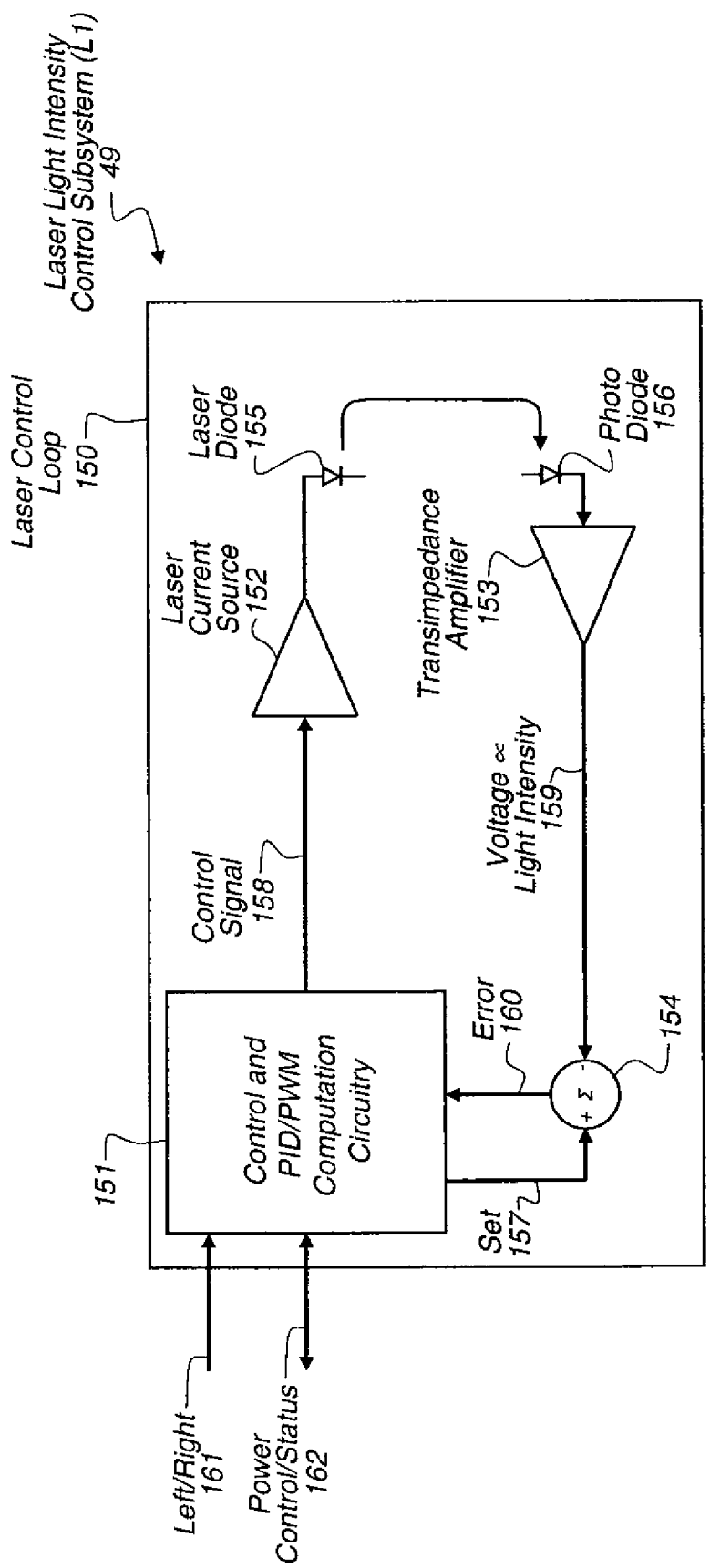
FIG. 17 illustrates a hardware implementation of a laser light intensity control subsystem, according to some embodiments of the present invention.

FIG. 17 illustrates a simplified hardware implementation of a portion of the L1 subsystem 49 that controls a single laser 26, according to some embodiments of the present invention. One skilled in the art will appreciate, however, that this design can be extended to control a plurality of lasers 26. In FIG. 17, a laser diode 155 is shown as representing laser 26. However, laser arrays 44 commonly use a single laser diode 155 to generate multiple laser beams. For purposes of clarity, however, FIG. 17 is described as controlling a laser diode 155.

Current through the laser diode 155 is provided by a laser current source 152 as a function of a control signal 158. The current source 152 is part of a laser driver 94 and can be a voltage controlled current source, a voltage controlled voltage source with direct analog current feedback and internal analog control loop, or a voltage controlled voltage source with digital control provided by an internal digital control loop and indirect current feedback. The current source 152 can be comprised of a digital to analog converter with appropriate amplifiers and circuitry to produce the current output, in which approach the control voltage (in control signal 158) will exist as a mathematical construct delivered to the current source 152 via one or more binary signals. The current source 152 can alternatively comprise analog and digital circuitry to produce a current output in direct response to the value voltage of the control signal 158.

The photo diode 156 samples the light emitted by the laser diode 155 to determine the intensity of this light. The current through the photo diode 156 provides the input to the transimpedance (current to voltage) amplifier 153. The output of the amplifier 153 is a voltage 159 that is proportional to the power of the light (intensity) sampled by the photo diode 156. The summation device 154 provides an error voltage 160 equal to the difference between a set voltage 157 and voltage 159 output from amplifier 153. In this regard, the set voltage 157 acts as a predetermined laser light intensity. The set voltage 157, in some embodiments, is derived from instructions received from the L2 subsystem 47. If the absolute value of the error voltage 160 is greater than a predetermined threshold amount, as determined by the control and PID/PWM computation circuitry 151, the control signal 158 is adjusted in a manner that brings such difference to within the threshold amount. The PID/PWM computation circuitry 151, more elaborately referred to as Proportional Integral Derivative Controller/Pulse Width Modulation computation circuitry 151, is known in the art.

The summation device 154, the error voltage 160 and the set voltage 157 can exist as discreet physical entities or as mathematical constructs within a digital version of the control and PID/PWM computation circuitry 151. Depending upon the embodiment being implemented, the control and PID/PWM computation circuitry 151 can receive control data, such as power or intensity output control data, from the L2 subsystem 47 and report status to the L2 subsystem 47 via the power control/status bus 162. For example, the control and PID/PWM computation circuitry 151 can be instructed via the power control/status bus 162 to reduce power to lasers when lasers from another color channel are at maximum output (per process states 110 in FIG. 7 and 310 in FIG. 14). Also, the PID/PWM computation circuitry 151 can report to the L2 subsystem 47 a failure to reach a requested (predetermined) laser output via the power control/status bus 162. In stereoscopic embodiments, the left/right signal 161 is provided from the upper levels in the control loop hierarchy and used by the circuitry 151 to modify the control signal 158 to alter the intensity of the laser 155 output in synchronization with the left and right image data.

Figure 18:
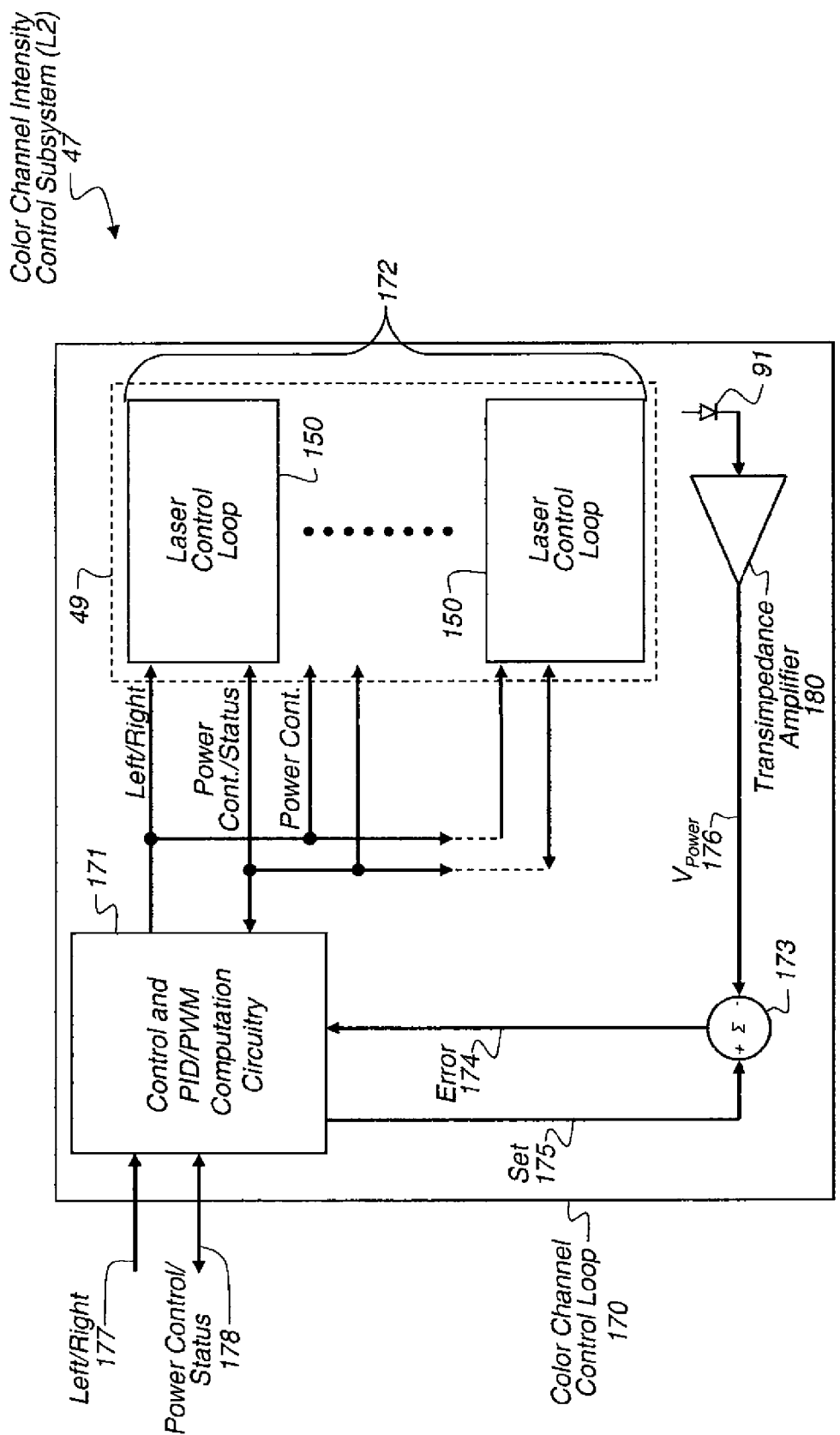
FIG. 18 illustrates a hardware implementation of a color channel intensity control subsystem, according to some embodiments of the present invention.

FIG. 18 illustrates a hardware implementation of the L2 subsystem 47, according to some embodiments of the present invention. The control and PID/PWM computation circuitry 171 for the color channel intensity control subsystem (L2) 47 monitors and controls the behavior of an entire array 172 of the lasers of a single color shown within the laser-intensity control subsystem 49 in FIG. 18. In these embodiments, the computation circuitry 171 acts as a single communications channel between each of the laser control loops 150 through which command data is passed to the laser control loops 150 and status data is passed from the laser control loops 150.

In some of the embodiments based on FIG. 18, a light intensity sensor 91, such as a photo diode, measures the color channel intensity output by the array of lasers 172. The light intensity sensor 91 can have the location represented by light-intensity sensing subsystem 92 shown in FIG. 6, FIG. 9, FIG. 10, FIG. 11, FIG. 12, or FIG. 13. The voltage generated by sensor 91 is passed to a transimpedance amplifier 180 to generate a signal Vpower 176 representative of the present intensity of the color channel. Vpower 176 is passed to a summation device 173, which compares Vpower 176 to a set voltage 175 and generates an error voltage 174. In this regard, Vpower 176 can correspond to the color channel intensity 103 in FIG. 7, the set voltage 175 can correspond to the predetermined color channel intensity 105 in FIG. 7, and the error voltage 174 can correspond to the difference 107 in FIG. 7. The set voltage 175, in some embodiments, is derived from instructions received from the L3 subsystem 59 via power control/status bus 178. If the absolute value of the error voltage 174 is greater than a predetermined threshold amount (e.g., threshold amount 109 in FIG. 7), as determined by the control and PID/PWM computation circuitry 171, one or more of the control loops 150 are instructed by the computation circuitry 171 to accordingly adjust their laser light intensities via power control/status bus 162 (see, e.g., process state 112 in FIG. 7). If the laser light intensities cannot be adjusted to reduce the error voltage 174 within the predetermined threshold amount, an error report can be sent to the L3 subsystem 59 via power control/status bus 178, according to some embodiments (see process state 110 in FIG. 7). In stereoscopic embodiments, the left/right signal 177 is used by the computation circuitry 171 to determine whether it is currently measuring and controlling color channel intensity for a left-eye light beam or a right-eye light beam. In these instances, the processes of FIG. 8 can be used.

It should be noted that, although FIG. 18 shows that the color channel intensity 176 is derived from the sensor 91, some embodiments have the color channel intensity 176 generated from a summation of the laser-output intensities provided to the computation circuitry 171 via power control/status bus 162. In other words, in lieu of using a separate sensing system 92 for color channel intensity measurement, such as that shown in FIGS. 6, 9, 11 and 12, for example, color channel intensity can be measured from information provided by the individual laser control loops 150 to the computation circuitry 171 via power control/status bus 162.

On the other hand, the sensor 91 in FIG. 18 may be shared by the other color channels, such as that shown in FIGS. 12 and 13, where the sensor 91 is located downstream of the dichroic combiner 17. In these embodiments, each color channel does not have its own sensor 91, shown in FIG. 18, but instead shares a single sensor or sensing system.

Figure 19:
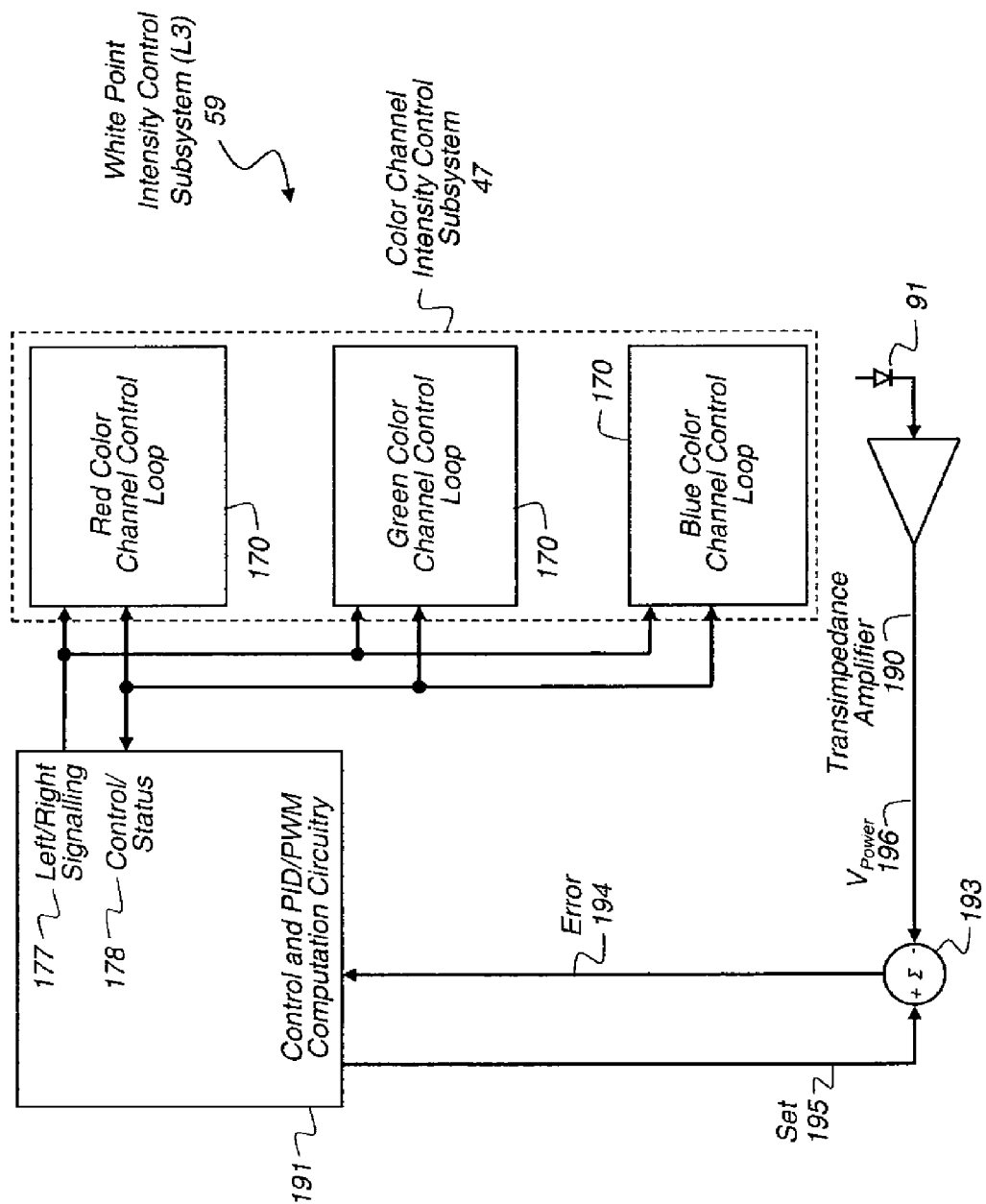
FIG. 19 illustrates a hardware implementation of a white point control subsystem, according to some embodiments of the present invention.

FIG. 19 illustrates a hardware implementation of the L3 subsystem 59, according to some embodiments of the present invention. The control and PID/PWM computation circuitry 191 for the white point control subsystem (L3) 59 monitors and controls the behavior of each color channel control loop 170 in the color channel intensity control subsystem (L2) 47. In these embodiments, the computation circuitry 191 acts as a single communications channel between each of the color channel control loops 170 through which command data is passed to the color channel control loops 170 and status data is passed from the color channel control loops 150.

In some of the embodiments based on FIG. 19, a light intensity sensor 91, such as a photo diode, is shown to measure the white point of the image forming system 11. In this regard, the light intensity sensor 91 can be in the location represented by light-intensity sensing subsystem 92 shown in FIGS. 12 and 13. Although FIG. 19 shows that the white point 196 is derived from the sensor 91, however, some embodiments have the color channel intensity 196 generated from a summation of the color channel output intensities provided to the computation circuitry 191 via power control/status bus 178. In other words, in lieu of using a separate sensing system 92 for white point measurement, white point can be measured from information provided by the individual laser control loops 170 to the computation circuitry 191 via power control/status bus 178. Such an arrangement corresponds to FIG. 15, and no separate sensor 91 would be provided in FIG. 19.

On the other hand, the sensor 91 in FIG. 18 may be shared by the color channel intensity control subsystem 47, such as that shown in FIGS. 12 and 13, where the sensor 91 is located downstream of the dichroic combiner 17. In these embodiments, each color channel does not have its own sensor 91, but instead shares a single sensor or sensing system that measures individual color channel intensities as well as white point.

Returning to the detail of FIG. 19, the voltage generated by sensor 91 is passed to a transimpedance amplifier 190 to generate a signal Vpower 196 representative of the present intensity of the white point. Vpower 196 is passed to a summation device 193, which compares Vpower 196 to a set voltage 195 and generates an error voltage 194. In this regard, Vpower 196 can correspond to the white point 303 in FIG. 14, the set voltage 195 can correspond to the predetermined white point 305 in FIG. 14, and the error voltage 194 can correspond to the difference 307 in FIG. 14. If the absolute value of the error voltage 194 is greater than a predetermined threshold amount (e.g., threshold amount 309 in FIG. 14), as determined by the control and PID/PWM computation circuitry 191, one or more of the control loops 170 are instructed by the computation circuitry 191 to accordingly adjust their color channel intensities via power control/status bus 178 (see, e.g., process states 310, 312 in FIG. 14). In stereoscopic embodiments, the left/right signal 177 can be used by the computation circuitry 191 to determine whether it is currently measuring and controlling white point of a left-eye light beam or a right-eye light beam. In these instances, processes similar to those of FIG. 8 can be used, except that white point is measured and controlled for the left-eye light beam and right-eye light beam separately.

Figure 20:
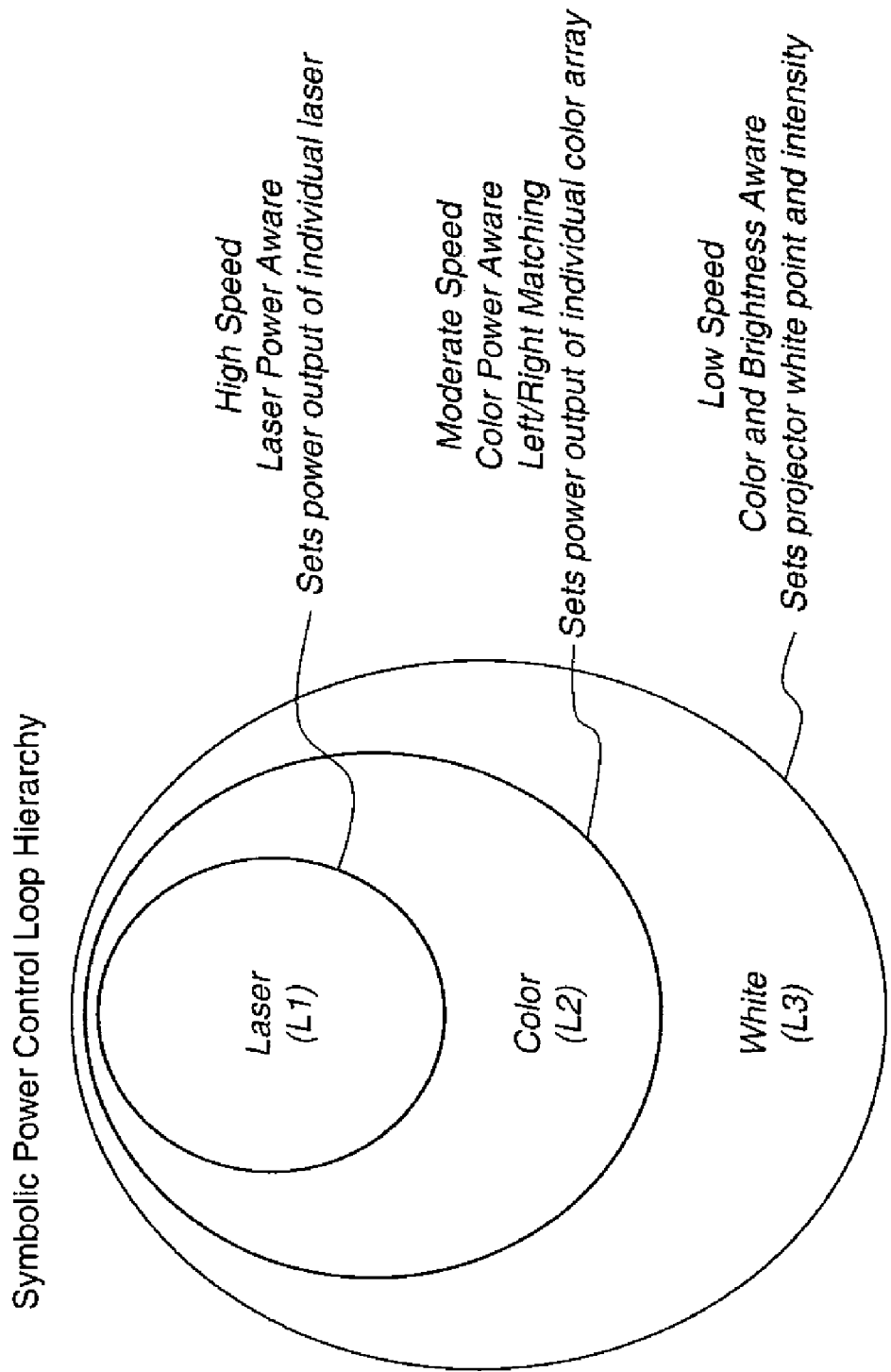
FIG. 20 illustrates relative sampling frequencies associated with a hierarchy of individual laser, color channel, and white point control loops, according to some embodiments of the present invention.

FIG. 20 illustrates a relative sampling frequency of each of the levels L1, L2, L3 in the control hierarchy. In embodiments of the present invention, control loops L1, L2, and L3 operate at different rates, so that they do not interfere with each other, but cooperate to maintain the desired white point and left-eye, right-eye balance. The speed of each loop varies according to how quickly a response is needed in order to maintain sufficient projection quality.

Laser control loop L1 operates at a relatively high speed to maintain the proper power level at each laser. In one embodiment, laser control loop L1 operates from approximately 50 kHz to approximately 200 kHz. Color channel control loop L2 operates more slowly for controlling the output of all lasers of the same color, but well above frame refresh rates. In one embodiment, color channel control loop L2 operates from about 1 kHz to about 10 kHz. White point control loop L3 operates at speeds well below frame refresh rates. In one embodiment, white point control loop L3 operates at about 1 to 2 cycles per second or slower.

Figure 21:
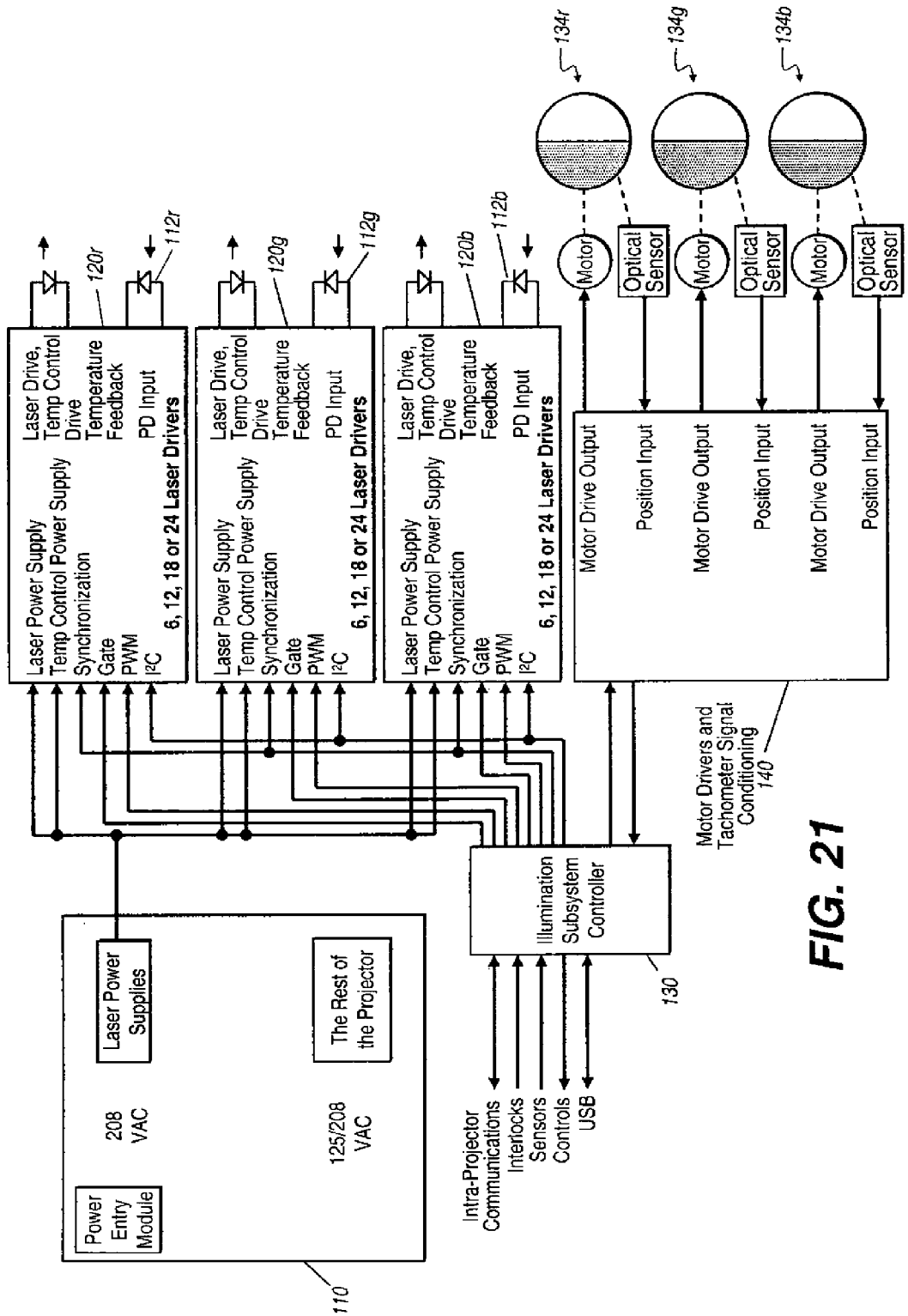
FIG. 21 illustrates one particular circuit layout that can be used to implement a particular embodiment of the present invention.

FIG. 21 illustrates one particular circuit layout that can be used to implement a particular embodiment of the present invention. This embodiment is a stereoscopic embodiment with L2 and L3 control loops present in an illumination subsystem controller 130. L1 subsystem control is not specifically shown. In FIG. 21, a power distribution circuit 110 provides source power for laser drivers in each color channel, shown as laser drivers 120*r*, 120*g*, and 120*b*. In this embodiment, each laser driver controls a bank of six, 12, 18, or 24 lasers. There is a corresponding light-intensity sensor 112*r*, 112*g*, 112*b* in each color channel, shown as a photodiode. A controller 130 provides synchronization and control of laser current and actuation based on detected conditions and optionally provides a corrective signal to one or more color channels in order to achieve suitable color balance or white point. Controller 130 responds to instructions, such as programmed instructions for obtaining color balance or white point and set up at initial factory calibration or instructions entered interactively by an operator for adjusting color balance or white point. A motor driver and signal conditioning circuit 140 provides the logic control and synchronization signals needed for operation of the shutter disk that acts as a stereo separator 134*r*, 134*g*, 134*b* for each color channel.

Parts List

10. Light projection system
11. Image forming subsystem
13. Projection subsystem
15. Light output from image forming subsystem
17. Dichroic combiner
19. Light modulation subsystem light dump path
21. Image path
22. Beam dump for light modulation subsystem
23. Light-intensity-correction system
26. Laser
31. Light redirecting prism
40*r*, 40*g*, 40*b*. Light modulation channel
41. Coherent light generated by light source subsystem
42. Light source subsystem
44, 44'. Solid-state laser array
44*a*, 44*b*. Bank of polarized laser arrays
45' 45*r*, 45*g*, 45*b*. Illumination combiner
46. Mirror
47. Color channel intensity control subsystem
49. Laser-light intensity control subsystem
50. Lens
51. Integrator
52. Light guide
53. Translucent cover
54. Lens
55. Integrator downstream exit surface
56. Integrator side
57. Left-eye light beam
58. Right-eye light beam
59. White point control subsystem
60. Light modulation subsystem
62. Polarization beamsplitter
64. Half wave plate 65. Shutter
66. Shutter motor
67. Shutter in image path
68. Shutter removed from image path
69. Mechanical arm
70. Projection optics
71. Rotating shutter
71a. Transmissive segment of rotating shutter
71b. Reflective segment of rotating shutter
71c. Transition region of rotating shutter
72. Rotating shutter motor
73. Beam dump in light source subsystem
74. Rotating shutter control circuitry
75. Light
76. Light source subsystem light dump path
80. Display surface
91. Light intensity sensor
92. Light-intensity sensing subsystem
93. Individual laser light-intensity sensor
94. Laser driver
100. Method
102, 104, 106, 108, 110, 112. Method states
103. Color channel intensity
105. Predetermined color channel intensity
107. Difference
109. Threshold amount
110. Power distribution circuit
112r, 112g, 112b. Sensor
120r, 120g, 120b. Laser driver
130. Controller
134r, 134g, 134b. Stereo separator
140. Motor driver and signal conditioning circuit
150. Laser control loops
151. Control and PID/PWM computation circuitry
152. Current source
153. Amplifier
154. Summation device
155. Laser diode
156. Photo diode
157. Set voltage
158. Control signal
159. Voltage output
160. Error voltage
161. Left/Right Signal
162. Power control/status bus
170. Color channel control loop
171. Control and PID/PWM computation circuitry
172. Array of lasers
176. Vpower
177. Left/Right signal
178. Power control/status bus
180. Transimpedance amplifier
191. Control and PID/PWM computation circuitry
200. Method
201. Left-eye light beam color channel intensity
202, 204, 206, 208, 210, 212. Method states
203. Right-eye light beam color channel intensity
207. Difference
209. Threshold amount
300. Method
302, 304, 306, 308, 310, 312. Method states
303. White point
305. Predetermined white point
307. Difference
309. Threshold amount

The invention claimed is:

1. A light projection system comprising:
an image forming subsystem configured at least to output a plurality of different color channels of light, the image forming subsystem comprising a plurality of light source subsystems each configured at least to generate a single color channel of the plurality of color channels output by the image forming subsystem, each light source subsystem comprising a plurality of lasers; and
a light-intensity-correction subsystem configured at least to:
determine laser light intensities output by individual lasers in each light source subsystem,
control each light source subsystem to change a light intensity of an individual laser if an absolute value of the corresponding determined laser light intensity deviates from a predetermined laser light intensity by a first threshold amount;
determine a color channel intensity for each of the plurality of color channels;
control each light source subsystem to change a light intensity output therefrom if an absolute value of the corresponding determined color channel intensity deviates from a predetermined color channel intensity by a second threshold amount;
determine a white point of the plurality of color channels; and
control the light source subsystems to change an intensity of one or more of the plurality of color channels if an absolute value of the determined white point deviates from a predetermined white point by a third threshold amount.

2. The system of claim 1, wherein the plurality of lasers in each light source subsystem output less than a maximum laser light intensity.

3. The system of claim 1, further comprising:
a projection subsystem configured at least to project an image,
wherein the image forming subsystem further comprises:
a plurality of light modulation subsystems each configured at least to interact with one of the plurality of different color channels in a manner consistent with image data;
wherein the light modulation subsystems each cause its color channel to follow either a light dump path or an image path in a manner consistent with the image data, and
wherein the light dump path(s) do not lead to the projection subsystem and the image path(s) do lead to the projection subsystem.

4. The system of claim 3, wherein each of the multiple color channels have separate light dump paths, and wherein the light-intensity-correction subsystem includes a light-intensity sensor in each light dump path.

5. The system of claim 4, wherein the light-intensity-correction subsystem determines the white point, the color channel intensities, or both based at least on input received from the light-intensity sensors in each light dump path.

6. The system of claim 3, wherein each of the multiple color channels share a light dump path, and wherein the light-intensity-correction subsystem includes a light-intensity sensor in the shared light dump path.

7. The system of claim 6, wherein the light-intensity-correction subsystem determines the white point, the color channel intensities, or both based at least on input received from the light-intensity sensor in the shared light dump path.

8. The system of claim 3, wherein the light-intensity-correction subsystem includes a light-intensity sensor in at least on one image path.

9. The system of claim 8, wherein the sensor is on a shutter in a closed position that prevents further projection of light in its path.

10. The system of claim 8, wherein the sensor is in a location in an image path where all of the plurality of color channels have been combined.

11. The system of claim 8, wherein the sensor is in a location in an image path where the plurality of color channels have not been combined.

12. The light projection system of claim 1, wherein if the light-intensity-correction subsystem determines first that a color channel intensity from a first of the light source subsystems is lower than a predetermined color channel intensity by at least a threshold amount, and determines second that the color channel intensity from the first light source subsystem cannot be increased to within the threshold amount of the predetermined color channel intensity then in response a color channel intensity for a second of the light source subsystem is reduced.

13. The system of claim 12, wherein the first determining occurs as part of the white point determination step.

14. A method for correcting light intensity generated by an image forming system, the method comprising:
generating, from the image forming system, a plurality of different color channels of light, the image forming system comprising a plurality of light source subsystems each configured at least to generate a single color channel of the plurality of color channels generated by the image forming system, each light source subsystem comprising a plurality of lasers;
determining laser light intensities output by individual lasers in each light source subsystem,
controlling each light source subsystem to change a light intensity of an individual laser if an absolute value of the corresponding determined laser light intensity deviates from a predetermined laser light intensity by a first threshold amount;
determining a color channel intensity for each of the plurality of color channels;
controlling each light source subsystem to change a light intensity output therefrom if an absolute value of the corresponding determined color channel intensity deviates from a predetermined color channel intensity by a second threshold amount;
determining a white point of the plurality of color channels; and
controlling the light source subsystems to change an intensity of one or more of the plurality of color channels if an absolute value of the determined white point deviates from a predetermined white point by a third threshold amount.

15. The method of claim 14, wherein at least some of the determining and changing occurs during or contemporaneously with completion of construction of the image forming system.

16. The method of claim 14, wherein at least some of the determining and changing occurs during or contemporaneously with a startup procedure initiated by a powering-on or rebooting of the image forming system.

17. The method of claim 14, wherein at least some of the determining and changing occurs just prior to projecting a video with the image forming system.

18. The method of claim 14, wherein at least some of the determining occurs when only one of the plurality of light source subsystems are generating light.

19. The method of claim 14, wherein at least some of the determining occurs by a light-intensity sensor on a shutter, and wherein the method further comprises closing the shutter into a closed position that prevents further projection of light in its path, the closing occurring prior to at least some of the determining.

20. The method of claim 19, wherein the determining of the laser light intensities occurs at a first frequency, the determining of the color channel intensities occurs at a second frequency lower than the first frequency, and the determining of the white point occurs at a third frequency lower than the second frequency.

21. The method of claim 20, wherein the first frequency is between approximately 50 kHz to approximately 200 kHz.

22. The method of claim 20, wherein the second frequency is between approximately 1 kHz to approximately 10 kHz.

23. The method of claim 21, wherein the second frequency is between approximately 1 kHz to approximately 10 kHz, and wherein the third frequency is about 1 or 2 cycles per second.

24. The method of claim 14, wherein if it is determined first that a color channel intensity from a first of the light source subsystems is lower than the predetermined color channel intensity by a threshold amount and it is determined second that the color channel intensity from the first light source subsystem cannot be increased to within the threshold amount of the predetermined color channel intensity, then in response a color channel intensity for a second light source subsystem is reduced.

25. The method of claim 24, wherein the first determining occurs as part of the white point determination process.

\* \* \* \* \*